United States Patent
Low

(10) Patent No.: US 11,562,282 B2
(45) Date of Patent: Jan. 24, 2023

(54) OPTIMIZED BLOCK ENCODING OF LOW-RANK FERMION HAMILTONIANS

(71) Applicant: Microsoft Technology Licensing, LLC, Redmond, WA (US)

(72) Inventor: Guang Hao Low, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 16/810,616

(22) Filed: Mar. 5, 2020

(65) Prior Publication Data
US 2021/0295194 A1   Sep. 23, 2021

(51) Int. Cl.
| | | |
|---|---|---|
| G06F 11/10 | (2006.01) | |
| G06F 11/30 | (2006.01) | |
| G06F 11/14 | (2006.01) | |
| G06F 11/16 | (2006.01) | |
| G06N 10/00 | (2022.01) | |
| G06F 17/16 | (2006.01) | |

(52) U.S. Cl.
CPC ............. *G06N 10/00* (2019.01); *G06F 17/16* (2013.01)

(58) Field of Classification Search
CPC ................................ G06F 17/16; G06N 10/00
See application file for complete search history.

(56) References Cited

U.S. PATENT DOCUMENTS

| | | | |
|---|---|---|---|
| 10,469,087 B1 * | 11/2019 | Granade | ................ B82Y 10/00 |
| 2003/0169041 A1 * | 9/2003 | Coury | .................... G06N 10/00 |
| | | | 324/307 |
| 2007/0180586 A1 * | 8/2007 | Amin | ...................... B82Y 10/00 |
| | | | 977/755 |
| 2020/0184023 A1 * | 6/2020 | Delaney | ................. G06N 5/003 |
| 2020/0279185 A1 * | 9/2020 | Wiebe | ...................... G06F 17/18 |

(Continued)

OTHER PUBLICATIONS

Babbush, et al., "Encoding Electronic Spectra in Quantum Circuits with Linear T Complexity", In Journal of Physical Review X vol. 8, Issue 4, Oct. 23, 2018, 36 Pages.

(Continued)

*Primary Examiner* — Guy J Lamarre
(74) *Attorney, Agent, or Firm* — Alleman Hall Creasman & Tuttle LLP

(57) ABSTRACT

In methods for simulating the evolution of a real-world quantum system over time, a state-preparation sequence of quantum gates is applied to a qubit register of a quantum computer. The state-preparation sequence is configured to prepare in the qubit register an initial model state representing an initial state of the real-world quantum system. A Hamiltonian operator for the real-world quantum system is received and used in the example method. The Hamiltonian operator represents two-body potential-energy interactions in a factorized form comprising at least one Majorana operator. A time-evolution-operator sequence of quantum gates comprising a block-encoded form of the Hamiltonian operator is now applied to the qubit register of the quantum computer, yielding a changed model state that represents a time-evolved state of the real-world quantum system. A measurement operation is applied subsequently to the qubit register. The measurement operation is configured to reveal an observable property of the changed model state.

20 Claims, 6 Drawing Sheets

(56) References Cited

U.S. PATENT DOCUMENTS

2021/0174236 A1* 6/2021 Babbush ................ G06N 10/20
2022/0067245 A1* 3/2022 Steiger ................... G06N 10/20

OTHER PUBLICATIONS

Berry, et al., "Qubitization of Arbitrary Basis Quantum Chemistry Leveraging Sparsity and Low Rank Factorization", In repository of arXiv, arXiv:1902.02134, Feb. 6, 2019, 44 Pages.

Chakraborty, et al., "The Power of Block-encoded Matrix Powers: Improved Regression Techniques via Faster Hamiltonian Simulation", In repository of arXiv, arXiv:1804.01973, Apr. 5, 2018, 60 Pages.

Childs, et al., "Hamiltonian Simulation Using Linear Combinations of Unitary Operations", In Journal of Quantum Information and Computation, vol. 12, Nov. 2012, 18 Pages.

Cuccaro, et al., "A New Quantum Ripple-carry Addition Circuit", In repository of arXiv, arXiv:quant-ph/0410184, Oct. 22, 2004, 9 Pages.

Gidney, Craig, "Halving the Cost of Quantum Addition", In Journal of Quantum, vol. 2, Jun. 18, 2018, 6 Pages.

Low, et al., "Hamiltonian Simulation by Qubitization", In Journal of Quantum, vol. 3, Jul. 12, 2019, 23 Pages.

Low, Guang Hao., "Hamiltonian Simulation with Nearly Optimal Dependence on Spectral Norm", In Proceedings of of the 51st Annual ACM SIGACT Symposium on Theory of Computing, Jun. 23, 2019, pp. 491-502.

Low, et al., "Optimal Hamiltonian Simulation by Quantum Signal Processing", In Physical Review Letters, vol. 118, Jan. 5, 2017, 6 Pages.

Low, et al., "Trading T-gates for Dirty Qubits in State Preparation and Unitary Synthesis", In repository of arXiv, arXiv:1812.00954, Dec. 3, 2018, 11 Pages.

Motta, et al., "Low Rank Representations for Quantum Simulation of Electronic Structure", In repository of arXiv, arXiv:1808.02625, Aug. 8, 2018, 8 Pages.

Peng, et al., "Highly Efficient and Scalable Compound Decomposition of Two-Electron Integral Tensor and its Application in Coupled Cluster Calculations", In Journal of Chemical Theory and Computation, vol. 13, Issue 9, Aug. 23, 2017, pp. 4179-4192.

Shende, et al., "Synthesis of Quantum-Logic Circuits", Published in Journal of IEEE Transactions on Computer-Aided Design of Integrated Circuits and Systems, vol. 25, Issue 6, Jun. 2006, pp. 1000-1010.

Suzuki, Masuo, "Fractal Decomposition of Exponential Operators with Applications to Many-body Theories and Monte Cado Simulations", In Journal of Physics Letters A, vol. 146, Issue 6, Jun. 4, 1990, pp. 319-323.

Babbush, et al., "Quantum Simulation of the Sachdev-Ye-Kitaev Model by Asymmetric Qubitization", In Repository of arXiv:1806.02793v2, Mar. 13, 2019, 4 Pages.

"International Search Report and Written Opinion Issued in PCT Application No. PCT/US2021/020428", dated Jul. 2, 2021, 17 Pages.

Zhao, et al.,"Measurement Reduction in Variational Quantum Algorithms", In Repository of arXiv:1908.08067v2, Dec. 16, 2019, 11 Pages.

* cited by examiner

| Method | T-gate count | Norm | Clean qubits |
|---|---|---|---|
| eq 15 [9] | $32 \sum_{r \in [R]} \max\left[\frac{L^{(r)}}{\epsilon}\right] \cdot \left[1 + \frac{1}{2} \frac{\lambda \ln 2 + 2N}{\ln \log(8/\epsilon) + 5\pi N}\right] + O(\lambda + N \log(N/\epsilon))$ | $2 \sum_{r \in [R]} |A^{(r)}| \, \|L^{(r)}\|_{EW}^2$ | $2N + O(\log(N/\epsilon))$ |
| Theorem 3 | | $\frac{1}{4} \sum_{r \in [R]} |A^{(r)}| \, \|L^{(r)}\|_{EW}^2$ | |
| eq 17 [10] | $O\!\left(N \sum_{r \in [R]} M^{(r)} \log\left(\frac{N}{\epsilon}\right)\right)$ | $O\!\left(\sum_{r \in [R]} |A^{(r)}| \, \|L^{(r)}\|_{SC}^2\right)$ | $2N$ |
| Theorem 4 | $\frac{64 \sum_{r \in [R]} N M^{(r)}}{\frac{1}{\kappa} \log \frac{2N + \kappa}{\epsilon} + \log \frac{8N}{\epsilon}} + O\!\left(\frac{N \log(N/\epsilon)(\lambda + N)}{\kappa}\right)$ | $\frac{1}{4} \sum_{r \in [R]} |A^{(r)}| \, \|L^{(r)}\|_{SC}^2$ | $2N + \kappa + O(\log(N/\epsilon))$ |

*FIG. 5*

OPTIMIZED BLOCK ENCODING OF LOW-RANK FERMION HAMILTONIANS

BACKGROUND

Nature comprises an infinitude of quantum systems ranging from materials and biological structures to molecules, atoms, and atomic nuclei. Other quantum systems are products of molecular, nano- and bio-molecular engineering. Accordingly, in the varied disciplines of chemistry, biochemistry, physics, and materials science, accurate modeling of quantum systems is a shared objective. A reliable model of a quantum system is one that can be used to predict, outside of the laboratory, the results of experiments to interrogate the quantum system. Model-based predictions can be used, therefore, to validate or refute a theory or to guide experimental work to systems with desirable properties.

Drugs are examples of quantum systems for which reliable modeling is desired. A typical drug is a molecule comprising perhaps dozens of atomic nuclei and hundreds of electrons. The efficacy of a drug may depend on its ability to bind to a particular receptor in a host organism, which is a function of the configuration of the atomic nuclei and of the distribution of the electrons in the ground state of the molecule. In principle, these properties can be predicted based on the ground-state solution V) to the eigenvalue equation $$H\psi = E\psi, \quad (1)$$

where H is the Hamiltonian operator for the system of electrons and atomic nuclei, and E is the ground-state energy of the molecule.

For some molecular systems, an approximate solution to eq 1 can be obtained conventionally, using a state-of-the-art digital computer. However, the computing effort required to solve eq 1 is quite high and increases steeply with the number of valence electrons in the molecule. Accordingly, a common practice in state-of-the-art molecular modeling is to apply increasingly aggressive approximations to the Hamiltonian as the number of valence electrons increases. However, a less accurate Hamiltonian may fail to reflect important features of the quantum system, such that the solution obtained from eq 1 fails to predict the true ground-state properties.

Similar computational inefficiency is observed in scenarios in which the goal is to simulate the evolution of a quantum system over time, from one state to another. That approach may be used, for example, to map the reaction-coordinate surface of a chemical reaction, examine reaction intermediates and kinetics, etc., or to predict how a quantum system will respond to an externally applied perturbation. In general, the evolution of a quantum system is governed by eq 2, $$i\hbar \frac{d\psi}{dt} = H\psi, \quad (2)$$

which, provided that H is independent of time, is solved by separation of variables, the general solution being a linear combination of the solutions of eq 1, each scaled by a time- and energy-dependent phase factor. Accordingly, the ability to work with an accurate Hamiltonian is important in these scenarios as well.

By inference, some of the difficulties of quantum simulation on conventional digital computers can be addressed via the fundamentally different architecture of a quantum computer. A quantum computer is a physical machine configured to execute logical operations based on or influenced by quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. In addition to computer modeling of quantum systems, such problems also include integer factorization, data searching, and function optimization as applied to systems of linear equations and machine learning. Moreover, it has been predicted that continued miniaturization of conventional computer logic structures will ultimately lead to the development of nanoscale logic components that exhibit quantum effects, and must therefore be addressed according to quantum-computing principles.

SUMMARY

This disclosure describes methods for simulating the evolution of a real-world quantum system over time. In one example method, a state-preparation sequence of quantum gates is applied to a qubit register of a quantum computer. The state-preparation sequence is configured to prepare in the qubit register an initial model state representing an initial state of the real-world quantum system. A Hamiltonian operator for the real-world quantum system is received and used in the example method. The Hamiltonian operator represents two-body potential-energy interactions in a factorized form comprising at least one Majorana operator. A time-evolution-operator sequence of quantum gates comprising a block-encoded form of the Hamiltonian operator is now applied to the qubit register of the quantum computer, yielding a changed model state that represents a time-evolved state of the real-world quantum system. A measurement operation is applied subsequently to the qubit register. The measurement operation is configured to reveal an observable property of the changed model state.

This Summary is provided in order to introduce a selection of concepts in a simplified form that are further described in the Detailed Description below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 provides a comparison of the T-gate count, normalization constant, and clean-qubit utilization for the block-encoding methods disclosed herein versus selected state-of-the-art methods.

DETAILED DESCRIPTION

Quantum Computer Architecture

Figure 1:
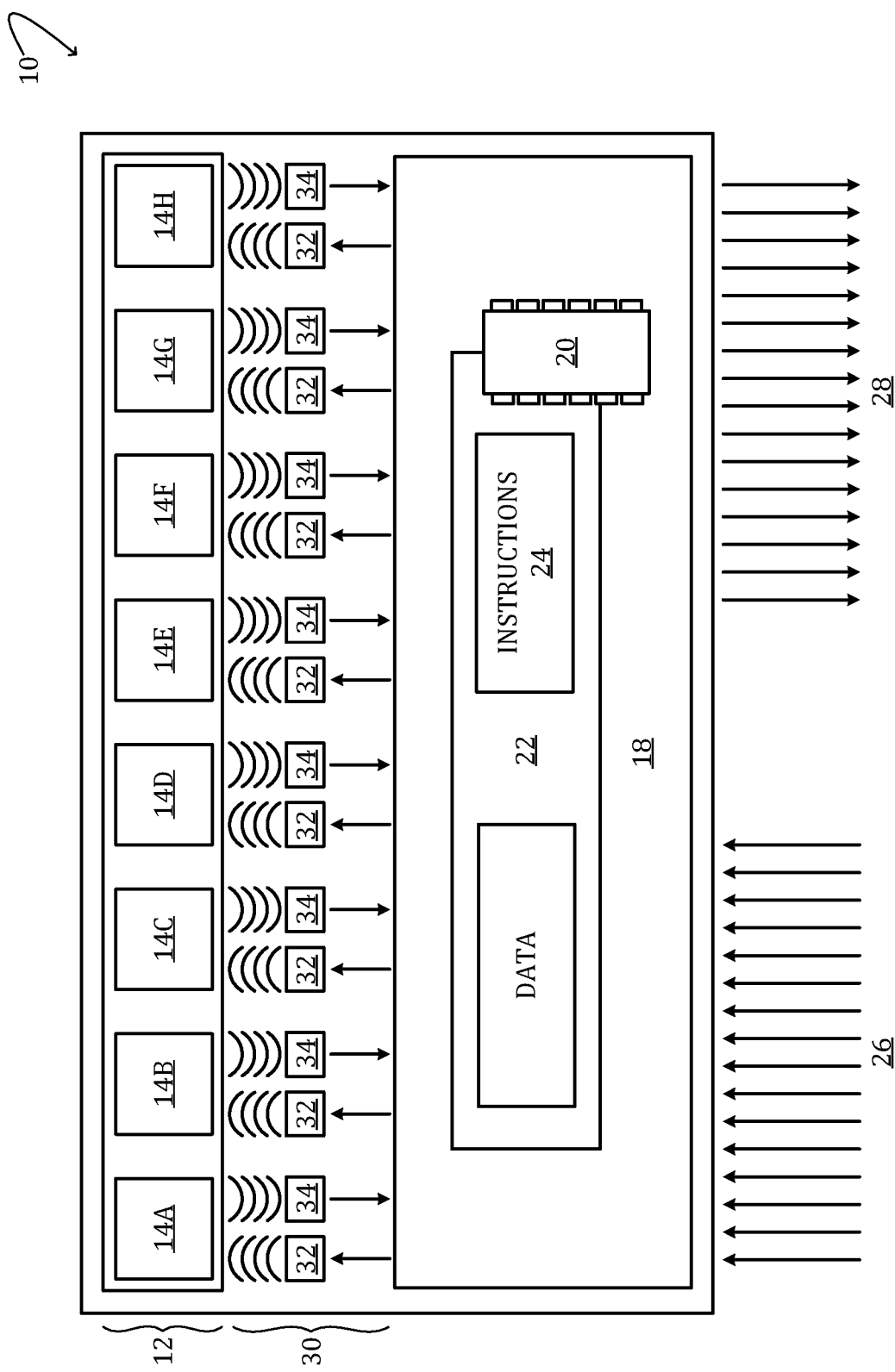
FIG. 1 shows aspects of an example quantum computer.

Prior to exploring the simulation of quantum systems, some aspects of quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes at least one qubit register 12 comprising an array of qubits 14. The illustrated qubit register is eight qubits in length; qubit registers comprising longer and shorter qubit arrays are also envisaged, as are quantum computers comprising two or more qubit registers of any length.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. More generally, each qubit 14 may comprise any particle or system of particles that can exist in two or more discrete quantum states that can be measured and manipulated experimentally. For instance, a qubit may be implemented in the plural processing states corresponding to different modes of light propagation through linear optical elements (e.g., mirrors, beam splitters and phase shifters), as well as in states accumulated within a Bose-Einstein condensate.

Figure 2:
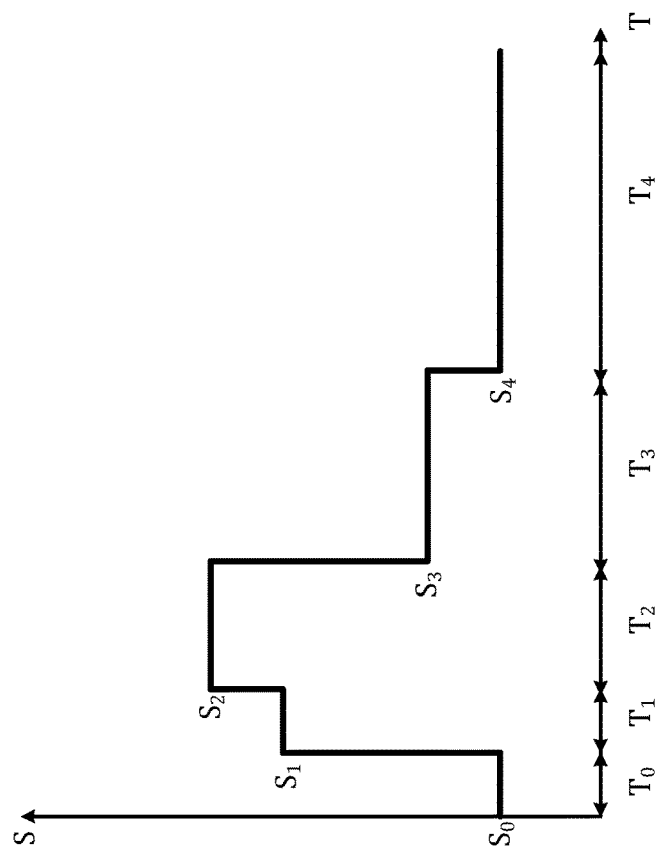
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. A processor 20 of controller 18 may be coupled operatively to peripheral componentry, such as network componentry, to enable the quantum computer to be operated remotely. A processor 20 of controller 18 may take the form of a central processing unit (CPU), a graphics processing unit (GPU), or the like. As such, the controller may comprise classical electronic componentry. The terms 'classical' and 'non-quantum' are applied herein to any component that can be modeled accurately as an ensemble of particles without considering the quantum state of any individual particle. Classical electronic components include integrated, micro-lithographed transistors, resistors, and capacitors, for example. Computer memory 22 may be configured to hold program instructions 24 that cause processor 20 to execute any function or process of the controller. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 26 and to provide a plurality of outputs 28. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit register 12 via quantum interface 30. The quantum interface is configured to exchange data bidirectionally with the controller. The quantum interface is further configured to exchange signal corresponding to the data bidirectionally with the qubit register. Depending on the architecture of quantum computer 10, such signal may include electrical, magnetic, and/or optical signal. Via signal conveyed through the quantum interface, the controller may interrogate and otherwise influence the quantum state held in the qubit register, as defined by the collective quantum state of the array of qubits 14. To this end, the quantum interface includes at least one modulator 32 and at least one demodulator 34, each coupled operatively to one or more qubits of the qubit register. Each modulator is configured to output a signal to the qubit register based on modulation data received from the controller. Each demodulator is configured to sense a signal from the qubit register and to output data to the controller based on the signal. The data received from the demodulator may, in some examples, be an estimate of an observable to the measurement of the quantum state held in the qubit register.

In some examples, suitably configured signal from modulator 32 may interact physically with one or more qubits 14 of qubit register 12 to trigger measurement of the quantum state held in one or more qubits. Demodulator 34 may then sense a resulting signal released by the one or more qubits pursuant to the measurement, and may furnish the data corresponding to the resulting signal to controller 18. Stated another way, the demodulator may be configured to output, based on the signal received, an estimate of one or more observables reflecting the quantum state of one or more qubits of the qubit register, and to furnish the estimate to the controller. In one non-limiting example, the modulator may provide, based on data from the controller, an appropriate voltage pulse or pulse train to an electrode of one or more qubits, to initiate a measurement. In short order, the demodulator may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 30 may be configured to implement one or more quantum-logic gates to operate on the quantum state held in qubit register 12. Whereas the function of each type of logic gate of a classical computer system is described according to a corresponding truth table, the function of each type of quantum gate is described by a corresponding operator matrix. The operator matrix operates on (i.e., multiplies) the complex vector representing the qubit register state and effects a specified rotation of that vector in Hilbert space.

For example, the Hadamard gate HAD is defined by $$HAD = \frac{1}{\sqrt{2}}\begin{bmatrix} 1 & 1 \\ 1 & -1 \end{bmatrix} \quad (3)$$

The HAD gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the HAD gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix} \quad (4)$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $\psi$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \quad (5)$$

The foregoing list of quantum gates and associated operator matrices is non-exhaustive, but is provided for ease of illustration. Other quantum gates include Pauli-X, -Y, and -Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
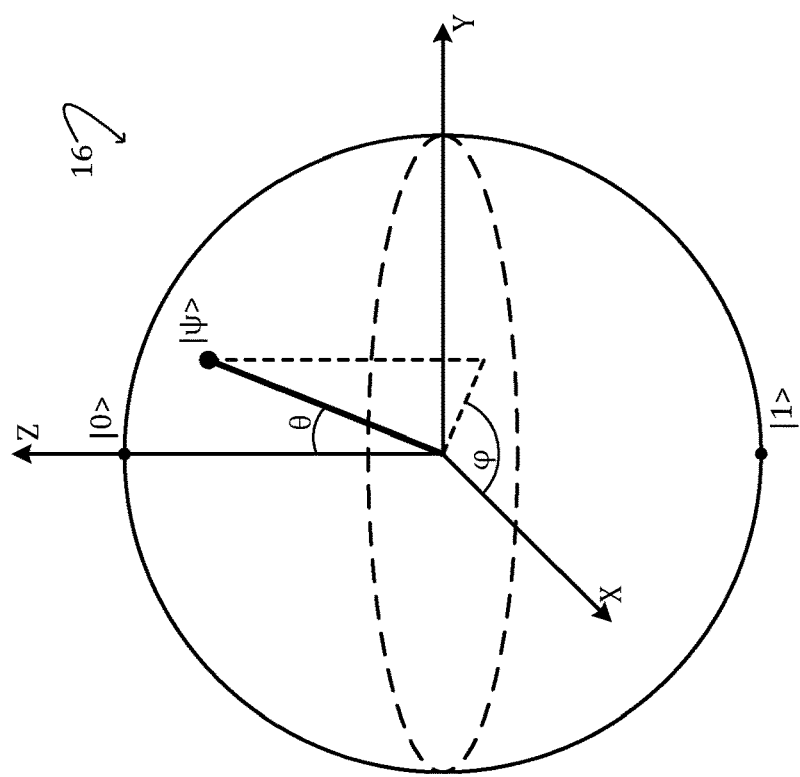
FIG. 3 shows aspects of an example signal waveform for effecting a quantum-gate operation in a quantum computer.

Continuing in FIG. 1, suitably configured signal from modulators 32 of quantum interface 30 may interact physically with one or more qubits 14 of qubit register 12 so as to assert any desired quantum-gate operation. As noted above, the desired quantum-gate operations are specifically defined rotations of a complex vector representing the qubit register state. In order to effect a desired rotation O, one or more modulators of quantum interface 30 may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of the qubit register. In general, each signal level $S_i$ and each duration $T_i$ is a control parameter adjustable by appropriate programming of controller 18.

The term 'oracle' is used herein to describe a predetermined sequence of elementary quantum-gate and/or measurement operations executable by quantum computer 10. An oracle may be used to transform the quantum state of qubit register 12 to effect a classical or non-elementary quantum-gate operation or to apply a density operator, for example. In some examples, an oracle may be used to enact a predefined 'black-box' operation $f(x)$, which may be incorporated in a complex sequence of operations. To ensure adjoint operation, an oracle mapping n input qubits $|x\rangle$ to m output or ancilla qubits $|y=f(x)\rangle$ may be defined as a quantum gate $O(|x\rangle \otimes |y\rangle)$ operating on the (n+m) qubits. In this case, O may be configured to pass the n input qubits unchanged but combine the result of the operation $f(x)$ with the ancillary qubits via an XOR operation, such that $O(|x\rangle \otimes |y\rangle) = |x\rangle \otimes |y \oplus f(x)\rangle$. As described further below, a state-preparation oracle is an oracle configured to generate a quantum state of specified qubit length for modeling a real-world quantum system.

Implicit in the description herein is that each qubit 14 of qubit register 12 may be interrogated via quantum interface 30 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting oracle that reveals the quantum state of the logical qubit with confidence.

Quantum Simulation via Qubitization

Simulating quantum systems is one of the most promising applications of quantum computers. Generally speaking, the system is described by a Hamiltonian H, which is a Hermitian matrix. The goal then is to synthesize a quantum circuit that approximates the real time-evolution operator $e^{-iHt}$, which is unitary, for some time t to some target error $\epsilon$. To date, a number of very general quantum algorithms for this problem have risen to prominence, such as Lie-Trotter-Suzuki product formulas [1], sparse Hamiltonian simulation [2], linear-combination of unitaries [3], qubitization [4], and quantum signal processing [5]. The algorithm of choice largely depends on the structure of H. The technique of qubitization has been noted in case studies [6] to be particularly promising in terms of T-gate complexity, and has a cost that is dominated by the so-called 'block-encoding' of the Hamiltonian [4, 7].

The block-encoding framework is a useful abstraction for designing quantum algorithms for linear algebra. Broadly speaking, the goal is to synthesize a unitary quantum circuit $\mathcal{B}[H/\alpha]$ that, in a matrix representation, encodes the Hamiltonian in the top-left block with some normalizing constant $\alpha \geq \|H\|$ like $$\mathcal{B}[H/\alpha] = \begin{pmatrix} H/\alpha & \cdots \\ \vdots & \ddots \end{pmatrix} \Rightarrow \mathcal{B}[H/\alpha]|0\rangle_a|\psi\rangle_s = |0\rangle_a\frac{H}{\alpha}|\psi\rangle_s + |0\psi^\perp\rangle_{as}, \quad (6)$$

where the unnormalized residual state $|0\psi^\perp\rangle_{as}$ has no support on the ancilla state $|0\rangle_a$. In that sense, $\mathcal{B}[H/\alpha]$ 'block-encodes' the Hamiltonian H. The block-encoding framework supports the addition and multiplication of encoded matrices. For instance, one may add block-encoded Hamiltonians $H=\Sigma_j H_j$ with a new normalizing constant such as $\alpha=\Sigma_j \alpha_1$, using the following quantum circuit:

$$\mathcal{B}[H/\alpha] = \left(\sum_j \langle j|_a \otimes \mathcal{I}_s \sqrt{\frac{\alpha_j}{\alpha}}\right) \quad (7)$$

$$\left(\sum_j |j\rangle\langle j|_a \otimes \mathcal{B}[H_j/\alpha_j]\right)\left(\sum_j \sqrt{\frac{\alpha_j}{\alpha}} |j\rangle_a \otimes \mathcal{I}_s\right).$$

Block-encoded Hamiltonians may also be multiplied to obtain $\mathcal{B}[H_2H_1/\alpha_2\alpha_1]$. In general, these addition and multiplication operations increase the ancilla register size in a straightforward manner. Using these ingredients, it is straightforward to block-encode matrices specified by a variety of common input models, such as sparse matrix oracle, linear-combination-unitaries, or other quantum data structures. In particular, time-evolution $e^{-iHt}$ can be approximated using $\mathcal{O}(\alpha t+\log(1/\epsilon))$ queries to $\mathcal{B}[H/\alpha]$, which typically dominates the cost of the algorithm.

Figure 4:
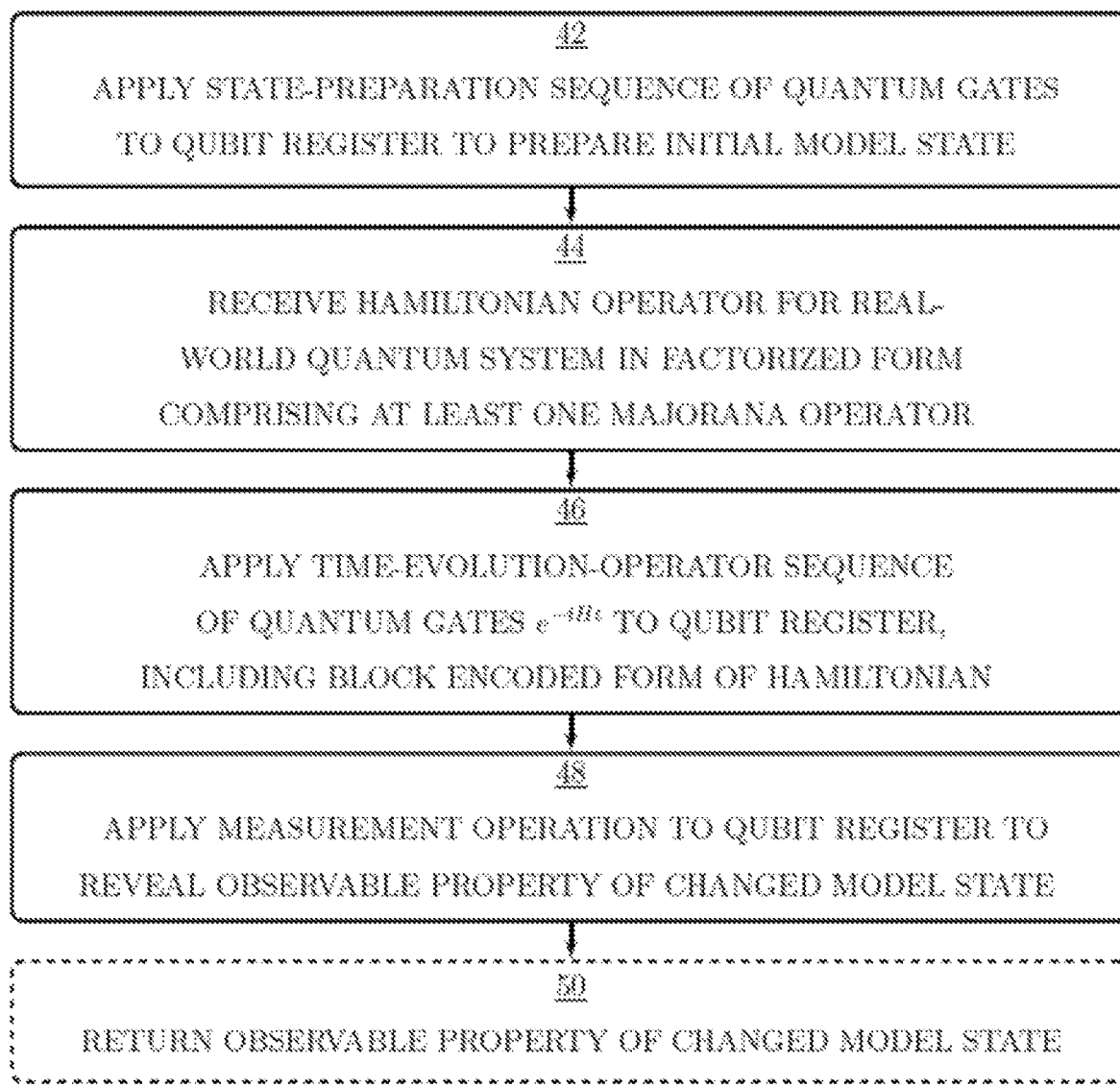
FIG. 4 shows aspects of an example method for simulating the evolution of a real-world quantum system over time.

Turning back to the drawings, FIG. 4 shows aspects of an example method 40 for simulating the evolution of a real-world quantum system over time. The quantum system may comprise a material, biological structure, nanoparticle, molecule, atom, or atomic nucleus, for example. To enact the simulation, method 40 employs a qubitization approach wherein time-evolution $e^{-iHt}$ is effected via a sequence of quantum-gate operations comprising a block-encoded form of the Hamiltonian operator.

At 42 of method 40, a state-preparation sequence of quantum gates is applied to a qubit register of a quantum computer. This action results in the preparation of an initial model state spanning a plurality of qubits of the qubit register. Typically, the initial state 'resembles', in some way, the real-world quantum system of interest. In some examples, the initial state may be an eigenstate of the Hamiltonian operator, such as the ground state, but that aspect is not strictly necessary. More generally, the term 'resembles' signifies quantum-state overlap; accordingly, the initial state may be a superposition of eigenstates of the Hamiltonian with a non-negligible component in the state of interest.

At 44 the Hamiltonian operator for the real-world quantum system is received in the quantum computer. Although the Hamiltonian operator originally may be defined over any convenient basis, the form of the Hamiltonian operator received in the quantum computer is defined in a factorized form comprising at least one Majorana operator.

At 46 a time-evolution-operator sequence of quantum gates is applied to the qubit register of the quantum computer. The time-evolution-operator sequence includes a block-encoded form of the Hamiltonian operator received at 44. The detailed manner of block encoding the Hamiltonian operator may differ from one implementation to the next; selected implementation examples are described in greater detail hereinafter. Application of the time-evolution-operator sequence yields, in the qubit register of the quantum computer, a changed model state which is changed relative to the initial model state prepared at 42 and which represents a time-evolved state of the real-world quantum system.

At 48 a measurement operation is applied to the qubit register of the quantum computer. The measurement operation is configured to reveal an observable property of the changed model state. Measurement of one or more observable properties can, in various ways, reveal useful information about the real-world quantum system of interest. In one example, successive applications of time-evolution may be interspersed by measurement on the qubit register. The average occupation number of spin-orbitals in a molecule, for example, can be obtained in this manner. Another example involves the use of quantum phase estimation to reveal an observable property of a given state. Quantum phase estimation employs time-evolution on the initial state, but with a duration controlled by an ancillary qubit register. Measuring the ancillary qubit register provides an estimate of the energy of an energy level. The quantum state of the system of interest is then projected into the state(s) of the revealed energy level. More particularly, the control qubit creates a superposition of two states: one where time-evolution is applied, and one where time-evolution is not applied. The state in which time-evolution is applied picks up a quantum phase factor that is the energy of the state. By looking at the difference in quantum phase of these two states, one may extract the energy, which is constant in the case of stationary states. Beyond knowing the energy of the changed model state, the state itself is useful, such as in combination with the above tactic involving successive measurement. Accordingly, the observable property measured at 48 may include, for instance, stationary-state properties such as the total energy, orbital angular momentum, or spin angular momentum of the quantum system modeled in the qubit register. In other examples, the observable property may include non-stationary-state properties such as particle positions and distributions thereof. Various other observable properties are equally envisaged. At 50 the observable property of the changed model state is returned by the quantum computer to facilitate modeling of the real-world quantum system.

No aspect of method 40 should be interpreted in a limiting sense, because numerous variations and extensions are envisioned. In some examples, application at 46 of the time-evolution operator sequence of quantum gates may include application of a programmable-rotation-gate array (vide infra). In some examples, application of the time-evolution-operator sequence of quantum gates may comprise application of a multiplexed sparse-data lookup (vide infra).

This disclosure provides algorithms for block-encoding Hamiltonians that are common in electronic structure problems:

$$H = \sum_{pq} h_{pq} a_p^\dagger a_q + \frac{1}{2}\sum_{pqrs} h_{pqrs} a_p^\dagger a_r^\dagger a_s a_q, \quad (8)$$

where the coefficients $h_{pq}$, $h_{pqrs}$ are real and satisfy the symmetries $h_{pq}=h_{qp}$ $h_{pqrs}=h_{qprs}=h_{pqrs}=h_{qpsr}=h_{srpq}=h_{srqp}=h_{rspq}=h_{rsqp}$, (9)

and the fermion operators satisfy the usual anti-commutation relations $\{a_p,a_q\}=0, \{a_p^\dagger,a_q^\dagger\}=0, \{a_p,a_q^\dagger\}=\delta_{pq}.$ (10)

In many instances, the fermion indices $p\equiv(i,\sigma)$ is a composite index where $i \in [N]$ indexes the orbital, and $\sigma \in \{0,1\}$ indexes the spin. Further specialization is provided for the case in which the Hamiltonian H is then a second-quantized representation of the first-quantized Hamiltonian $$H_{first} = \quad (11)$$

$$\left(-\sum_{n \in electrons} \frac{\nabla_n^2}{2} - \sum_{m \in nuclei} \frac{Z_m}{|x_n - r_m|}\right) + \left(\sum_{n_1, n_2 \in electrons} \frac{1}{|x_{n_1} - x_{n_2}|}\right),$$

where $\nabla_n^2$ is the Laplace operator on the $n^{th}$ electron, $Z_m$ is the nuclear charge, and $r_m$ is the nucleus coordinate. By choosing basis orbital wavefunctions $\psi_i(x)$, this implies the second-quantized representation $$H = \sum_{i,j,\sigma} h_{i,j} a_{(i,\sigma)}^\dagger a_{(j,\sigma)} + \frac{1}{2} \sum_{i,j,k,l,\sigma,\rho} h_{i,j,k,l} a_{(i,\sigma)}^\dagger a_{(k,\rho)}^\dagger a_{(l,\rho)} a_{(j,\sigma)}, \quad (12)$$

$$h_{i,j} = \int \psi_i^*(x_1)\left(-\frac{\nabla^2}{2} - \sum_m \frac{Z_m}{|x_1 - r_m|}\right)\psi_j(x_1)d^3x_1,$$

$$h_{i,j,l,k} = \int \psi_i^*(x_1)\psi_j(x_1)\left(\frac{1}{|x_1 - x_2|}\right)\psi_k^*(x_2)\psi_l(x_2)d^3x_1 d^3x_2.$$

It is convenient to work with the representation obtained by anti-commuting the k, l indices.

$$H = \sum_{i,j,\sigma} \tilde{h}_{i,j} a_{(i,\sigma)}^\dagger a_{(j,\sigma)} + \frac{1}{2} \sum_{i,j,k,l,\sigma,\rho} h_{i,j,k,l} a_{(i,\sigma)}^\dagger a_{(j,\sigma)} a_{(k,\rho)}^\dagger a_{(l,\rho)}, \quad (13)$$

$$\tilde{h}_{i,j} = h_{i,j} - \frac{1}{2} \sum_l h_{i,l,l,j}.$$

The symmetry constraints in eq 9 imply a further simplification. Without loss of generality, it may be assumed that the two-electron tensor admits a rank R factorization $$h_{ijkl} = \sum_{r=1}^R \Lambda^{(r)} L_{ij}^{(r)} L_{kl}^{(r)\top}, \quad \|L^{(r)}\|_{SC} \doteq \sum_{m \in [M^{(r)}]} |\lambda_m^{(R)}| = 1, \quad (14)$$

$$\|L^{(r)}\|_{EW} = \sum_{ij \in [N]} |L_{ij}^{(r)}|,$$

where $L^{(r)}$ is normalized to have unit Schatten 1-norm, which is the sum of the absolute value of the eigenvalues. This factorization may be computed by a singular-value decomposition, or a Cholesky decomposition. In either case, the primary benefit is a reduction in the number of terms needed to represent the two-electron tensor by truncating, as the rank R for typical systems varies from R~log(N) to R~N[8, 9] instead of the worst case of R≤$N^2$. Whereas $h_{ijkl}$ is specified by $\frac{1}{8}N(N+1)(N^2+N+2) = \mathcal{O}(N^4)$ independent real numbers, the factorization is specified by significantly fewer $$\frac{R}{2}N(N+1) = \mathcal{O}(RN^2)$$

real numbers.

Substituting the two-electron factorization into the Hamiltonian of eq 13, the result is $$H = \quad (15)$$

$$\underbrace{\sum_{ij \in [N], \sigma \in \{0,1\}} \tilde{h}_{i,j} a_{(i,\sigma)}^\dagger a_{(j,\sigma)}}_{H_1} + \underbrace{\frac{1}{2} \sum_{r \in [R]} \Lambda^{(r)} \left(\sum_{ij \in [N], \sigma \in \{0,1\}} L_{ij}^{(r)} a_{(i,\sigma)}^\dagger a_{(j,\sigma)}\right)^2}_{H_2}.$$

The block-encoding of such Hamiltonians has been previously considered [9]. A second level of factorization uses the singular value decomposition of $$L^{(r)} = \sum_{m \in [M^{(r)}]} \lambda_m^{(r)} \vec{R}_m^{(r)} \cdot \left(\vec{R}_m^{(r)}\right)^\top. \quad (16)$$

Thus, $$H = \underbrace{\sum_{ij \in [N], \sigma \in \{0,1\}} \tilde{h}_{i,j} a_{(i,\sigma)}^\dagger a_{(j,\sigma)}}_{H_1} + \quad (17)$$

$$\underbrace{\frac{1}{2} \sum_{r \in [R]} \Lambda^{(r)} \left(\sum_{ij \in [N], \sigma \in \{0,1\}} \sum_{m \in [M^{(r)}]} \lambda_m^{(r)} R_{m,i}^{(r)} \cdot \vec{R}_{m,j}^{(r)} a_{(i,\sigma)}^\dagger a_{(j,\sigma)}\right)^2}_{H_2}.$$

The advantage of this approach is dependence on the Schatten norm $\|L^{(r)}\|_{SC}$, which, can be considerably smaller than the entry-wise $\|L^{(r)}\|_{EW}$. For any square N×N matrix h, $$\|h\|_{SC} \doteq \sum_{k \in [N]} |Eigenvalues[h]_k|, \quad (18)$$

$$\frac{1}{N}\|h\|_{EW} \le \|h\|_{SC} \le \|h\|_{EW}.$$

In an implementation on a fault-tolerant quantum computer, it is also desirable to minimize the number of quantum T-gates used, which are non-Clifford and hence much more costly than other Clifford gates, which are assumed to be free.

FIG. 5 provides a comparison of the T-gate count, normalization constant, and clean-qubit utilization for the block-encoding methods disclosed herein versus selected state-of-the-art methods. For each case, block-encoding of the most costly two-body term is achieved with an error $\epsilon$. It will be assumed that $\lambda$ additional dirty qubits are available to reduce T gate count, and that $\kappa \in [1, N]$ is any integer, and $n_x \doteq \lceil \log_2 \kappa \rceil$. As shown in this table, the main new contributions include a number of improvements that reduce both the quantum T-gate complexity and the normalizing constant of the two-electron component of the Hamiltonian. Although the main results, Theorems 3 and 4, are presented separately, they may also be combined. On one hand, Theorem 3 is well-suited for rank components that are sparse in the single-factorized picture and have small norms. On the other hand, Theorem 4 is well-suited for rank components that are sparse in the double-factorized picture and have large norms. It is possible, therefore, to split the two-electron term into two parts: rank components with large norms or are not sparse in the single-factorized picture are encoded using Theorem 4, and the rest are encoded using Theorem 3.

The high-level overview of this approach begins with a particular alternative representation of the electronic structure Hamiltonian in terms of Majorana fermions. For each fermion operator $\alpha_p$, $\alpha_q^\dagger$, the following Majorana operators are defined:

$$\gamma_{p,0} = \alpha_p \alpha_p^\dagger, \gamma_{p,1} = -i(\alpha_p - \alpha_p^\dagger), \alpha_p = (\gamma_{p,0} + i\gamma_{p,1})/2, \alpha_q = (\gamma_{p,0} - i\gamma_{p,1})/2. \quad (19)$$

These satisfy identities $$\{\gamma_{p,x}, \gamma_{q,y}\} = 2\delta_{pq}\delta_{xy}I \quad (20)$$

Using this representation the following is proven in the Appendix.

Theorem 1. Electronic structure single-factorized Majorana representation. The Hamiltonian of eq 15 is represented by $$H = \underbrace{\left(\sum_i \tilde{h}_{ii} + \frac{1}{2}\sum_{ij} h_{iijj} - \frac{1}{8}\sum_{ij} h_{ijji}\right)I}_{I_H} + \quad (21)$$

$$One_{L^{(-1)}} + \underbrace{\frac{1}{4}\sum_{r=1}^R \Lambda^{(r)} T_2[One_{L^{(r)}}]}_{Two_H},$$

$$One_L = \frac{i}{2}\sum_{ij}\sum_\sigma L_{ij}\gamma_{i,\sigma,0}\gamma_{j,\sigma,1}, \quad L_{ij}^{(-1)} = \tilde{h}_{ij} + \sum_l h_{ilij}.$$

where $T_2(x) = 2x^2 - 1$ is a Chebyshev polynomial of the first kind.

Here the focus is on block-encoding the two-electron component, whose cost typically dominates the one-electron component. In addition to containing more terms, the two-electron component also has the largest normalization constant.

Figure 6:
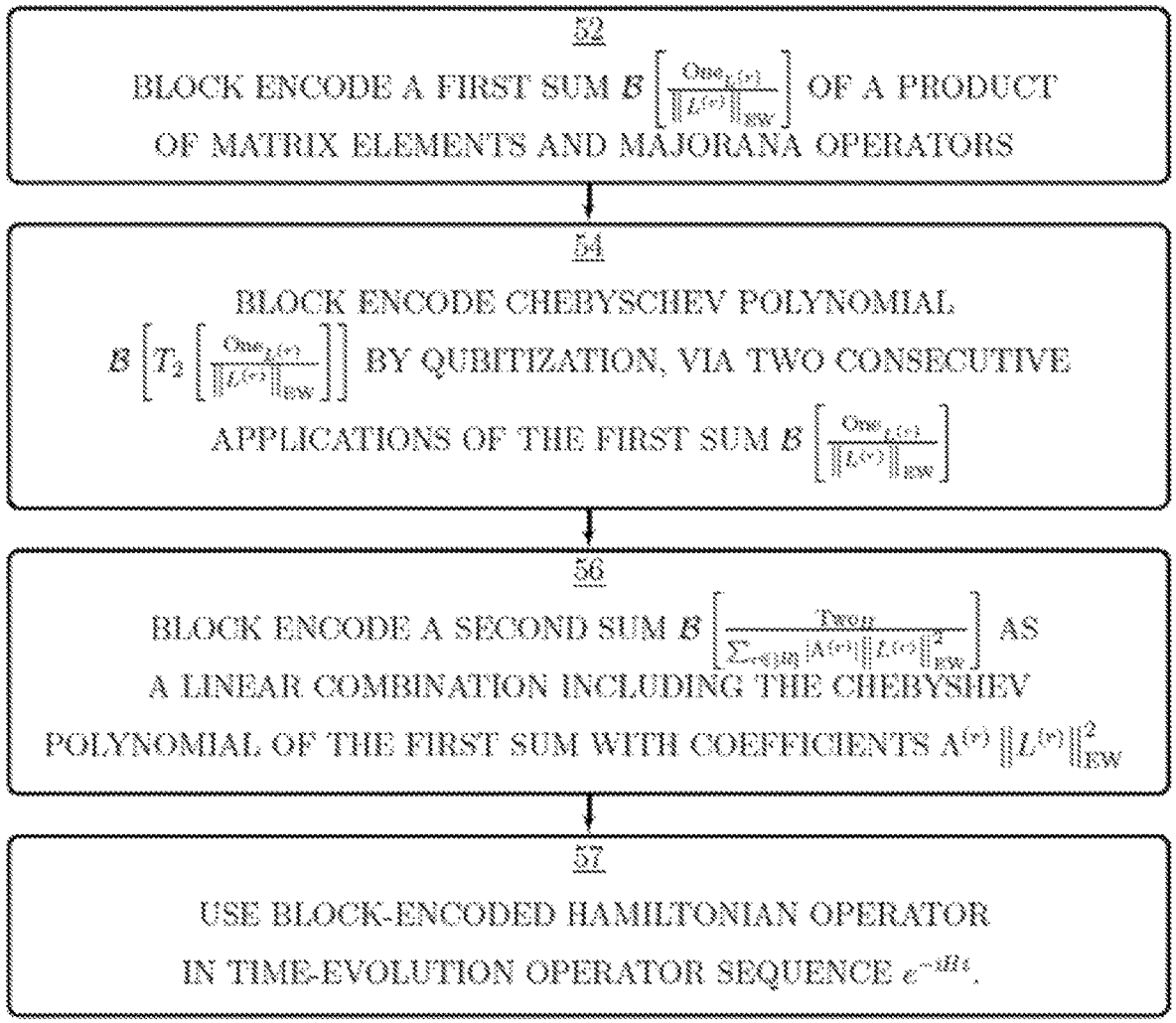
FIG. 6 shows aspects of an example method of block encoding a Hamiltonian operator into a time-evolution-operator sequence of quantum gates.

FIG. 6 shows aspects of an example method 46A of block-encoding the above singly-factorized form of the Hamiltonian operator into a time-evolution-operator sequence of quantum gates. Method 46A may be implemented as one instance of step 46 of the method of FIG. 4.

As noted above, in the form of the Hamiltonian operator used in method 46A, two-body potential-energy interactions are represented by a rank-factorized tensor. At 52 of method 46A, a first sum $$\mathcal{B}\left[\frac{One_{L^{(r)}}}{\|L^{(r)}\|_{EW}}\right]$$

of a product of matrix elements and Majorana operators is block-encoded. At 54 a Chebyshev polynomial $$\mathcal{B}\left[T_2\left[\frac{One_{L^{(r)}}}{\|L^{(r)}\|_{EW}}\right]\right]$$

is block-encoded by quubitization, via two consecutive applications of the first sum $$\mathcal{B}\left[\frac{One_{L^{(r)}}}{\|L^{(r)}\|_{EW}}\right][4].$$

At 56 a second sum $$\mathcal{B}\left[\frac{Two_H}{\sum_{r\in[R]} |\Lambda^{(r)}|\|L^{(r)}\|_{EW}^2}\right]$$

is block-encoded as a linear combination including the Chebyshev polynomial $$\mathcal{B}\left[T_2\left[\frac{One_{L^{(r)}}}{\|L^{(r)}\|_{EW}}\right]\right]$$

of the first sum with coefficients $\Lambda^{(r)}\|L^{(r)}\|_{EW}^2$.

The first new result in FIG. 5 is obtained by a careful implementation of these steps. Whereas the one-norm contribution of the two-electron terms by Babbush et al. is [9]

$$2\sum_{r\in[R]} |\Lambda^{(r)}|\|L^{(r)}\|_{EW}^2, \quad (22)$$

this form may be reduced to $1/4\Sigma_{r\in[R]}|\Lambda^{(r)}|\|L^{(r)}\|_{EW}^2$, which amounts to a factor eight speedup. In the double-factorized format the following representation is used.

Theorem 2. Electronic structure double-factorized Majorana representation. The Hamiltonian of eq 15 is represented by $$H = \quad (23)$$

$$I_H + One_{L^{(-1)}} + \frac{1}{4}\sum_{r=1}^R \Lambda^{(r)} T_2\underbrace{\left[\frac{1}{2}\sum_{k\in[M^{(r)}]} \lambda_k^{(r)} \sum_{\sigma\in[0,1]} \gamma_{\vec{R}_k^{(r)},\sigma,0}\gamma_{\vec{R}_k^{(r)},\sigma,1}\right]}_{Two_H},$$

$$\gamma_{\vec{u},\sigma,x} = \sum_j u_j \gamma_{k,\sigma,x}.$$

Figure 7:
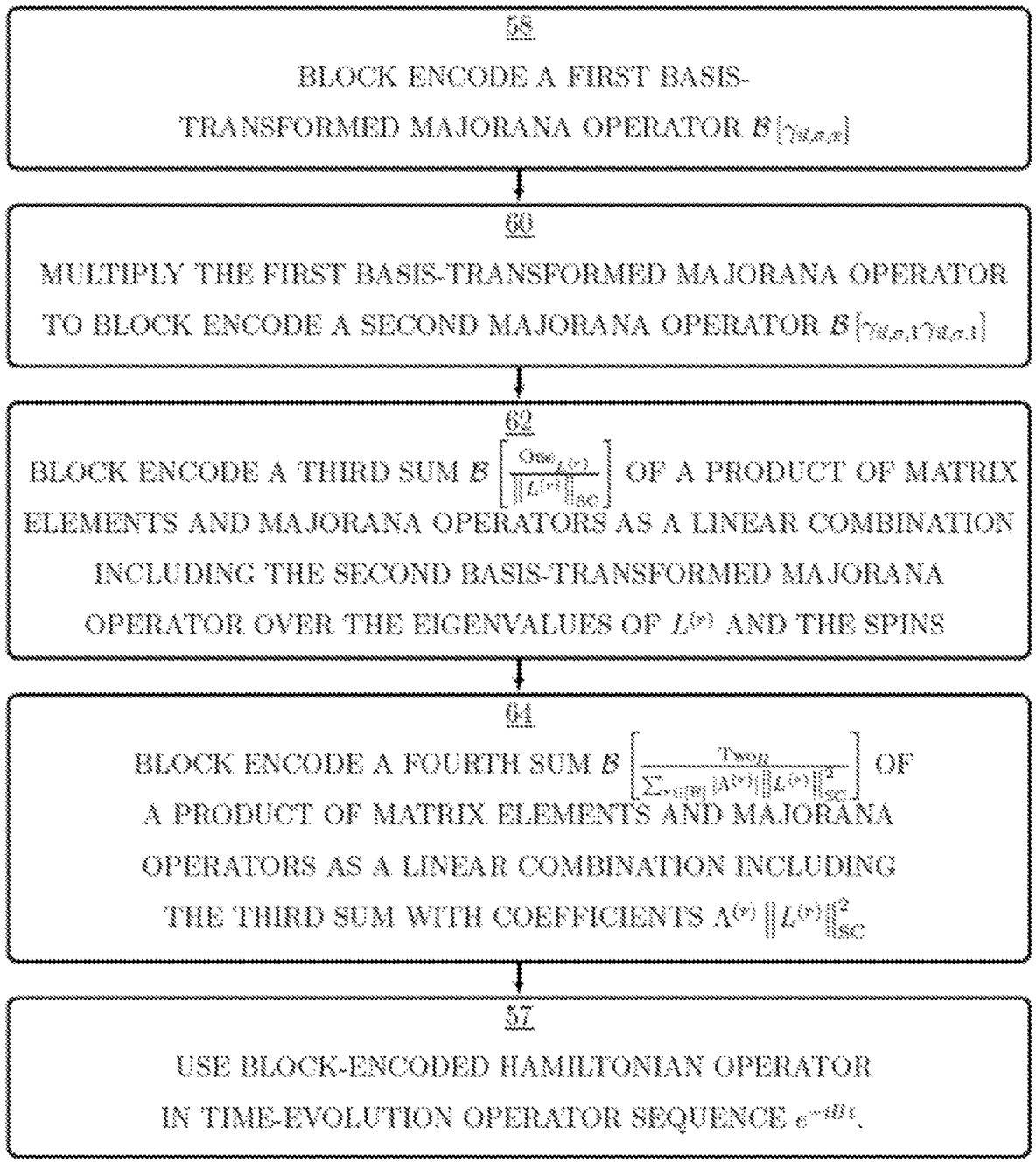
FIG. 7 shows aspects of another example method of block encoding a Hamiltonian operator into a time-evolution-operator sequence of quantum gates.

FIG. 7 shows aspects of an example method 46B of block-encoding the above doubly-factorized form of the Hamiltonian operator into a time-evolution-operator sequence of quantum gates. Method 46B may be implemented as one instance of step 46 in the method of FIG. 4.

As noted above, in the form of the Hamiltonian operator used in method 46B, the rank-factorized tensor representing the two-body potential-energy interactions is further factorized in order to reduce the norm of one or more eigenvalues. At 58 of method 46B, a first basis-transformed Majorana operator $\mathcal{B}[\gamma_{\vec{u},\sigma,x}]$ is block encoded. At 60 the first basis-transformed Majorana operator is multiplied in order to block encode a second Majorana operator $\mathcal{B}[\gamma_{\vec{u},o,1}\gamma_{\vec{u},o,1}]$. At 62 a third sum $$\mathcal{B}\left[\frac{One_{L^{(r)}}}{\|L^{(r)}\|_{SC}}\right]$$

of a product of matrix elements and Majorana operators is block encoded as a linear combination including the second basis-transformed Majorana operator over the eigenvalues of $L^{(r)}$ as well as the spins. At 64 a fourth sum $$\mathcal{B}\left[\frac{Two_H}{\sum_{r\in[R]}|\Lambda^{(r)}|\|L^{(r)}\|_{SC}^2}\right]$$

of a product of matrix elements and Majorana operators is block encoded as a linear combination including the third sum $$\mathcal{B}\left[T_2\left[\frac{One_{L^{(r)}}}{\|L^{(r)}\|_{SC}}\right]\right]$$

with coefficients $\Lambda^{(r)}\|L^{(r)}\|_{SC}^2$.

Implementing these block-encodings requires several new quantum circuit constructions, which are outlined herein in detail. A common theme throughout will be the use of symmetries. Many coefficients turn out to be identical. For instance, $L_{ij}^{(r)}=L_{ji}^{(r)}$, and is independent of spin. Moreover, the same coefficients $\vec{R}_k^{(r)}$ occur in both of $\gamma_{\vec{u},o,1}$ $\gamma_{\vec{e},o,1}$. Wherever possible, this redundancy is used in order to optimize the number of bits of classical data needed to encode into the quantum circuits herein. These optimizations are combined with recent advances using dirty qubits [10] to substantially reduce T gate count.

Preliminaries

Let L be an N×N symmetric square matrix with eigenvalues $\{\lambda_k\}_{k\in[N]}$. The set $[N]=\{k\}_{k=0}^{N-1}$ contains N consecutive integers starting from zero. The entry-wise one-norm is $\|L\|_{Ew}=\Sigma_{jk\in[N]}|L_{jk}|$, and the Schatten one-norm is $\|L\|_{SC}=\Sigma_{j\in[N]}|\lambda_j|$. The entry-wise one-norm of a vector $\vec{u}\in\mathbb{C}^N$ is $\|\vec{u}\|_{Ew}=\Sigma_{j\in[N]}|u_j|$. Let $L_{LT}$ be the lower triangular component of L added to the strictly lower triangular component of L. Thus $\|L_{LT}\|_{Ew}=\|L\|_{Ew}$. Let nnz$[L]\le N^2$ counts the number of non-zero elements of L. Thus $$nnz[L_{LT}] \le \frac{N}{2}N+1,$$

and nnz$[\vec{u}]\le N$.

Quantum circuit diagrams are used heavily herein in implementing block-encoding of the electronic structure Hamiltonian. Indeed, a picture speaks a thousand words, and many the proofs herein follow from combining these diagrams. All the quantum circuits used herein are constructed from the following primitive elements.

Unitary and its adjoint: $|\psi\rangle_s$ —[U]— $U|\psi\rangle_s$, $|\psi\rangle_s$ —[U†]— $U^\dagger|\psi\rangle_s$,  (24)

Controlled unitary: = $|0\rangle\langle 0|\otimes I + |1\rangle\langle 1|\otimes U$.  (25)

Multiplexed unitaries: = $\sum_j |j\rangle\langle j|\otimes U_j$,  = $\sum_{j,k} |j\rangle\langle j|\otimes |k\rangle\langle k|\otimes U_{j,k}$.  (26)

(27)

Controlled multiplexed unitary: = $|0\rangle\langle 0|\otimes I + |1\rangle\langle 1|\otimes \sum_j |j\rangle\langle j|\otimes U_j$.  (28)

Data-lookup that XORs $\vec{x}_k$ with $\vec{z}$: $|k\rangle_a$ —(k)— $|k\rangle_a$ ; $|z\rangle_s$ —[$\vec{x}_k$]— $|z\oplus\vec{x}_k\rangle_s = |z_0\oplus x_{k,0}\rangle\ldots$.  (29)

Unitary that prepares $|\vec{a}\rangle$: $|0\rangle$ —[$|\vec{a}\rangle$]— $|\vec{a}\rangle = \sum_j \sqrt{\frac{|a_j|}{\|\vec{a}\|_1}}|j\rangle$.  (30)

Unitary that prepares $\overline{|\vec{a}\rangle}$: $|0\rangle$ —[$|\vec{a}\rangle$]— $|\vec{a}\rangle = \sum_j \text{sign}[a_j]\sqrt{\frac{|a_j|}{\|\vec{a}\|_1}}|j\rangle$.  (31)

Unitary that prepares $|\vec{a},f\rangle$: $|0\rangle_1$ —(f)—, $|0\rangle_2$ —[$|\vec{a},f\rangle$]—, $|\vec{a},f\rangle = \sum_j \sqrt{\frac{|a_j|}{\|\vec{a}\|_1}}|f(j)\rangle_1|j\rangle_2$.  (32)

Block encoding unitary: $|0\rangle_1$, $|\psi\rangle_2$ —[$\mathcal{B}\left[\frac{H}{\alpha}\right]$]— $|0\rangle_1 \frac{H}{\alpha}|\psi\rangle_2 + \ldots$.

The block-encoding of a unitary is trivially itself: 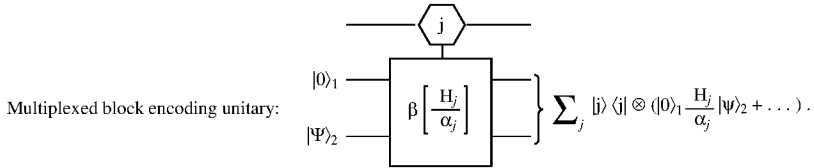  (33)

Multiplexed block encoding unitary: 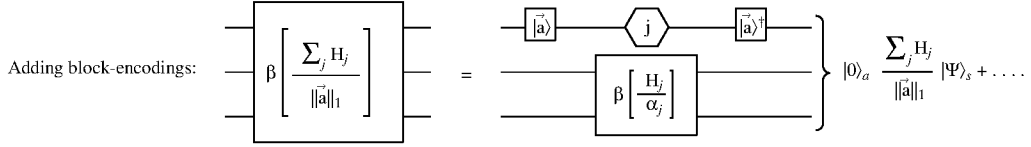  (34)

Adding block-encodings: 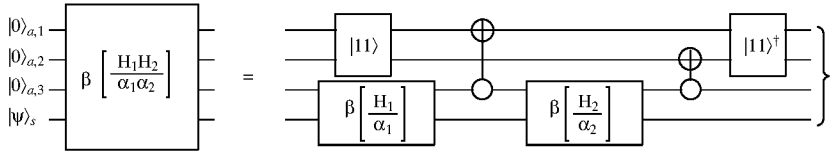  (35)

Multiplying block-encodings:

$$|0\rangle_{a,1}\ |0\rangle_{a,2}\ |0\rangle_{a,3}\ |\psi\rangle_s\ \beta\left[\frac{H_1 H_2}{\alpha_1\alpha_2}\right] = \left\{|11\rangle\ \beta\left[\frac{H_1}{\alpha_1}\right]\ \beta\left[\frac{H_2}{\alpha_2}\right]\ |11\rangle^\dagger\right\}$$

$$|0\rangle_a \frac{H_1 H_2}{\alpha_1\alpha_2}|\psi\rangle_s + \ldots \quad (36)$$

The costs of these quantum circuits are expressed in terms of primitive quantum gates and qubits. Primitive quantum gates are defined herein as those acting on at most two qubits, and the Clifford gates {HAD, S, CNOT} are distinguished from the non-Clifford T gate. Some of these circuits may be implemented by ancilla qubits that are not shown, in addition to the 'register' qubits that are shown. These invisible qubits are all borrowed, meaning that they are returned to the same initial state at the end of the circuit. These ancilla qubits are called 'clean' herein if their initial state is the computational basis state $|0\rangle$. In contrast, the ancilla qubits are called 'dirty' if their initial state is arbitrary and unknown.

In some cases, a quantum circuit U is approximated by U' to some error $\|U-U'\|\leq\epsilon$ in spectral norm. The errors of multiple approximate quantum circuits add linearly, following the triangle inequality $$\|U_0 U_1\cdots U_{N-1} - U_0' U_1'\cdots U_{N-1}'\| \leq \sum_{j\in[N]} \|U_j - U_j'\|. \quad (37)$$

Data-Lookup Oracle

Given a list of d bit-strings $\vec{a}\in\{0,1\}_{d\times b}$, each of length b, the data-lookup oracle in eq 28 returns the bit-string $a_x$.

Lemma 1. Data-lookup oracle [6]. The data-lookup oracle in eq 28 and its controlled version can be implemented using:

T gates: 4(d-1).
Clifford gates: $\Theta(db)$.
Register qubits: $b+\lceil\log_2(d)\rceil$.
Clean qubits: $\lceil\log_2(d)\rceil$.

According to Low et al. [10], the T gate cost of data-lookup can be further reduced by adding $\lambda$ additional qubits. These qubits can clean, meaning they start in and are returned to the computational basis state $|0\rangle$. Further circuit optimizations by Berry et al. [9] further reduce the cost by constant factors.

Lemma 2. Data-lookup oracle with clean qubit assistance [10, 9]. For all integer $\lambda\geq 0$, the data-lookup oracle in eq 28 and its controlled version can be implemented using:

• T gates: $4d/\lfloor 1+\frac{\lambda}{b}\rfloor + 8\lambda + \tilde{O}(\log(d))$.
• Clifford gates: $\Theta(db)$.
• Register qubits: $b+\lceil\log_2(d)\rceil$.
• Clean qubits: $\lambda + \lceil\log_2(d)\rceil + O(1)$.

Note that the additional $O(1)$ clean qubits and $O(\log(d))$ T gates only needed when $$\left\lfloor 1+\frac{\lambda}{b}\right\rfloor$$

is not a power of two. In this case, they are used in an intermediate step to reversibly compute the remainder and quotient of $$j/\left\lfloor 1+\frac{\lambda}{b}\right\rfloor,$$

where the numerator $j\in[N]$ is stored in a $n_d$ qubit register. These assisting qubits can also be dirty, meaning that start in and are returned to the same initial state. This is useful whenever the quantum algorithm has any idling qubits. To simplify notation in the following, it is assumed that $$\left\lceil \frac{\lambda}{b} \right\rceil$$

is a power of two.

Lemma 3. Data-lookup oracle with dirty qubit assistance [10, 9]. For all integer $\lambda \geq b$ such that $$\left\lfloor 1 + \frac{\lambda}{b} \right\rfloor$$

is a power of two, the data-lookup oracle in eq 28 and its controlled version can be implemented using:

- T gates: $8d / \left\lfloor 1 + \frac{\lambda}{b} \right\rfloor + 16\lambda$.
- Clifford gates: $\Theta(db)$.
- Register qubits: $b + \lceil \log_2(d) \rceil$.
- Clean qubits: $\lceil \log_2(d) \rceil$.
- Dirty qubits: $\lambda$.

The bit-strings output by these lookup oracles may be uncomputed by applying their adjoint. This doubles their gate complexity at most. The gate complexity of uncomputation can be improved [9]. This improvement reduces the additive $16\lambda$ T gate term to $$\frac{16}{b}\lambda,$$

which becomes significant when $\lambda \sim \sqrt{bd}$. It is useful to define the T gate count function $$DATA_{d,b,\lambda} = \min_{\lambda' \in [b,\lambda]} \left(8d / \left\lfloor 1 + \frac{\lambda}{b} \right\rfloor + 16\lambda\right) \gtrsim \sqrt{2^9 bd}, \quad (38)$$

which returns the smallest possible T gate count for any number of A available dirty qubits.

State Preparation Unitary

Quantum state preparation is a unitary circuit that prepares a desired quantum state. A number of different quantum circuit implementations of eqs 29 and 30 are known, each with different trade-offs in qubit count, and the various quantum gates. For instance, the approach by Shende et al. [11] uses $\lceil \log_2 d \rceil$ qubits and d arbitrary single-qubit rotations, and $\mathcal{O}(d)$ other two-qubit Clifford gates.

For the present purposes, it suffices to prepare quantum states where each $|j\rangle$ is, in general, entangled with some arbitrary quantum state $|Garbage_j\rangle$.

$$|\vec{a}\rangle = \sum_{j=0}^{d-1} \sqrt{\frac{|a_j|}{\|\vec{a}\|_1}} |j\rangle |Garbage_j\rangle \quad (39)$$

As this includes eq 29 as a special case, quantum circuits for state preparation with garbage can use fewer T gates, though at the expense of more qubits. This garbage state may be safely ignored in the remainder of this disclosure. Accordingly, it is not necessary to differentiate between the state preparation unitaries of eq 29 and eq 39. Moreover, the circuits for $|\vec{a}\rangle$ and $|\vec{a}\rangle$ are very similar and have the same T gate cost. The following implementation, which approximates each coefficient to a targeted precision, is invoked repeatedly herein.

Lemma 4. Approximate quantum state preparation with garbage [6]. Given a list of d positive coefficients $\vec{a} \in )^d$ and the desired bits of precision $\mu$, the quantum state $$|\psi\rangle = \sum_{j=0}^{d-1} \sqrt{p_j} |j\rangle |Garbage_j\rangle, \quad (40)$$

$$\left| p_j - \frac{a_j}{\|\vec{a}\|_1} \right| \leq \frac{2^{-\mu}}{d} \Rightarrow \left\| \vec{p} - \frac{\vec{a}}{\|\vec{a}\|_1} \right\|_1 \leq 2^{-\mu},$$

can be prepared by a unitary U, and U is approximated to error $\in$ using one application of any data-lookup oracle from the 'Data-lookup oracle' section above, for d bit-strings of length $\lceil \log_2(d) \rceil + 2\mu$, for a total of T gates: $4\mu + DATA_{d,\lceil \log_2(d) \rceil + 2\mu, \lambda} + \Theta(\log(d/\in))$.

Clifford gates: $\Theta(d\mu + \log(1/\in))$.

Register qubits: $n_d$.

Garbage qubits: $2\mu + n_d$

Clean qubits: $n_d + \mathcal{O}(1)$

Dirty qubits: $\lambda$

When many coefficients of $|j\rangle_b$ are zero, it is useful for the T count to scale with the number of non-zero elements nnz $[\vec{a}]$ rather than with d. The modification of eq 29 that outputs some additional bits specified by a Boolean function $f: [d] \rightarrow \{0, 1\}^b$ is also useful. On one hand, the unitary of eq 31 can be implemented by combining state preparation in eq 29 with data-lookup eq 26 as follows.

$$\left. \begin{array}{c} |0\rangle_1 \!-\!\!\boxed{f}\!-\! \\ |0\rangle_2 \!-\!\boxed{|\vec{a}, f\rangle}\!-\! \end{array} = \begin{array}{c} \!-\!\boxed{x_j = f(j)}\!-\! \\ \!-\!\boxed{|\vec{a}\rangle}\!\!\langle j \rangle\!-\! \end{array} \right\} |\vec{a}, f\rangle = \sum_{j \in [d]} \sqrt{\frac{|a_j|}{\|\vec{a}\|_1}} |f(j)\rangle_1 |j\rangle_2. \quad (41)$$

Thus the T gate cost of eq 41 is at most that of state preparation plus data-lookup on d elements. On the other hand, the approach by Babbush et al. [6] enables a T gate cost of eq 31 that identical to state preparation with garbage eq 29—additional bits may be output using only $\mathcal{O}(db)$ additional Clifford gates. This is:

Lemma 5. Approximate sparse quantum state preparation with garbage [9]. Given a list of d positive coefficients $\vec{\alpha} \in \mathbb{R}^d$, the desired bits of precision $\mu$, and a Boolean function $f: [d] \to \{0, 1\}^b$, the quantum state $$|\psi\rangle = \sum_{j=0}^{d-1} \sqrt{p_j} |f(j)\rangle |Garbage_j\rangle, \qquad (42)$$

$$\left| p_j - \frac{a_j}{\|\vec{a}\|_1} \right| \le \frac{2^{-\mu}}{d} \Rightarrow \left\| \vec{p} - \frac{\vec{a}}{\|\vec{a}\|_1} \right\|_1 \le 2^{-\mu},$$

can be prepared by a unitary U, and U is approximated to error $\in$ using one application of any data-lookup oracle from the 'Data-lookup oracle' section above, for d bit-strings of length 2b 2$\mu$, for a total of T gates: $4\mu + \text{DATA}_{d,\lceil \log_2(d) \rceil + 2\mu, \lambda} + \Theta(\log(d/\in))$.
Clifford gates: $\Theta(d(b+\mu) + \log(1/\in))$.
Register qubits: b.
Garbage qubits: $2\mu + 2n_d + b$.
Clean qubits: $n_d + \mathcal{O}(1)$.
Dirty qubits: $\lambda$.

Block-encoding framework

These two components of state preparation and select allow an implementation of a block-encoding.

Definition 1. Block-encoding implementation without sign qubit. Given the unitaries $\text{STATE}_{\vec{a}}$, and $\text{SELECT}_{\vec{U}}$, let $$H = \sum_{j=0}^{d-1} \frac{a_j}{\|\vec{a}\|_1} U_j.$$

Then the block encoding $\mathcal{B}[H/\|\vec{\alpha}\|_1]$, where $\langle \mathbf{1}_\alpha \mathcal{B}[H/\|\alpha\|_1]|0\rangle$, $=H/\|\vec{\alpha}\|_1$, is implemented by

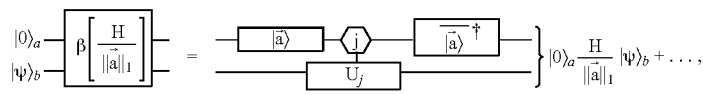

Note that the same Hamiltonian by be block-encoded by many quantum circuits. For instance, the quantum circuit may explicitly implement the coefficient sign as follows,

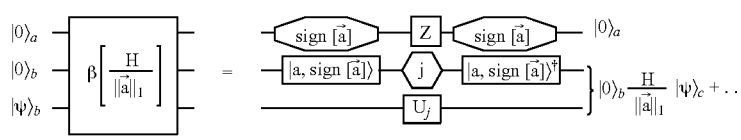

where Z is the Pauli $Z|x\rangle = (-1)^x |x\rangle$, and $$\text{sign } [\vec{a}](j) = \frac{1 - \text{sign}(a_j)}{2} \in \{0, 1\}.$$

This implementation has the advantage that its controlled version only needs to apply a control to the select unitary. In particular, the T gate cost of controlled $-\mathcal{B}[H/\|\vec{\alpha}\|_1]$ is identical to $\mathcal{B}[H/\|\vec{\alpha}\|_1]$ when the select unitary is implemented following the approach by Babbush et al. [6]. Moreover, note that the state preparation unitary is always followed up by by its adjoint. Thus the same Hamiltonian is block-encoded even if state preparation in eq 39 entangled with an garbage state [6].

Errors in state preparation or unitary synthesis introduce errors into the block-encoded Hamiltonian. It is useful to define the approximate block-encoding.

Definition 2. Approximate block-encoding. By definition, $\rangle_\in [H/\alpha] \doteq \rangle [H'/\alpha]$ is an $\in$-approximate block-encoding of $\mathcal{B}[H/\alpha]$ if $$\|H'/\alpha - H/\alpha\| \le \in \qquad (45)$$

For instance, the following is an approximation due to error in the coefficient of the quantum state.

Lemma 6. Approximate block-encoding using approximate state preparation. Using the approximate state preparation circuit of 4 with precision parameter $\mu$ in the block-encoding circuit of 1 produces an $\in$-approximate block-encoding $\mathcal{B}_\in [H/\|\vec{\alpha}\|_1]$, where $\in = 2^{-\mu}$.

Proof. Let $\vec{p}$ be such that $\|\vec{p} - \vec{\alpha}/\|\vec{\alpha}\|_1\|^1 \le 2^{-\mu}$. Let $H' = \sum_j U_j$, and $H = \sum_j \alpha_j U_j$. Then $$\left\| \frac{H}{\|\vec{a}\|_1} - H' \right\| = \left\| \sum_j \left( \frac{a_j}{\|\vec{a}\|_1} - p_j \right) U_j \right\| \le 2^{-\mu}. \qquad (46)$$

Qubitization

The following result on qubitization, a generalization of quantum walks, is also used.

Definition 3. Qubitization. Let $\mathcal{B}[H]$ be a block-encoding of a Hamiltonian H with spectral norm $\|H\| \le 1$, and an ancillary register with M qubits. Then there is a quantum circuit $\mathcal{B}[T_j[H]]$ that block-encodes $T_j[H]$, where $T_j[x]=\cos(j\cos^{-1}(x))$ is a Chebyshev polynomial of the first kind.

$$\mathcal{B}[H] = \begin{pmatrix} H & \cdots \\ \vdots & \ddots \end{pmatrix} \Rightarrow \mathcal{B}[T_j[H]] = \begin{pmatrix} T_j[H] & \cdots \\ \vdots & \ddots \end{pmatrix} \quad (47)$$

In particular, following the work of Low and Chuang [4], this circuit

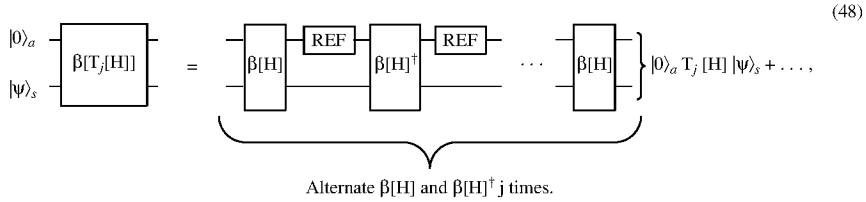

(48)

Alternate $\beta[H]$ and $\beta[H]^\dagger$ j times.

costs j total queries to $\mathcal{B}[H]$ and its inverse, and j−1 reflections $REF=2|0\rangle\langle 0|_a - \mathcal{I}_{a,a}$ on the ancilla register.

In obtaining these results, a key insight is working in a Majorana representation. Note that each Majorana operator maps to a single unique Pauli string. For instance in the Jordan-Wigner representation, $$\gamma_{p,0} \to Z_0 \cdots Z_{p-1} X_p \rangle_{p+1} \cdots, \gamma_{p,1} \to Z_0 \cdots Z_{p-1} Y_p \rangle_{p+1} \cdots . \quad (49)$$

Note that $p=j+N\sigma$ is a composite spin-orbits index.

Majorana Circuits

The unitary quantum circuits that implement these Majorana operators [6] are used heavily herein.

Definition 4. Majorana quantum circuits. The Majorana circuit $$\begin{array}{c} \xrightarrow{\phantom{xx}} \boxed{k} \xrightarrow{\phantom{xx}} \\ \xrightarrow{\phantom{xx}} \boxed{e^{i2\pi\theta_k Z}} \xrightarrow{\phantom{xx}} \end{array} = \sum_{k\in[N]} |k\rangle\langle k| \otimes e^{i2\pi\theta_k Z} \quad (50)$$

$$MAJ_x = \begin{array}{c} |j\sigma\rangle \longrightarrow \boxed{j\sigma} \longrightarrow |j\sigma\rangle \\ |\psi\rangle \longrightarrow \boxed{\gamma_{j,\sigma,x}} \longrightarrow \gamma_{j,\sigma,x}|\psi\rangle \end{array} = \sum_{j=0}^{N-1}\sum_{\sigma\in\{0,1\}} |j\sigma\rangle\langle j\sigma| \otimes \gamma_{j,\sigma,x}$$

in a Jordan-Wigner representation is $$MAJ_{JW,x} = \sum_{j=0}^{N-1}\sum_{\sigma\in\{0,1\}} |j\sigma\rangle\langle j\sigma| \otimes I^{\otimes 2N-q-1} \otimes (H^x X H^x) \otimes Z^{\otimes q}, \quad (51)$$

$$q = j + N\sigma.$$

Majorana circuits are unitary and Hermitian and satisfy the anti-commutation relations $$\{\langle j\sigma|MAJ_{JW,x}|j\sigma\rangle\mathcal{B}, \langle k\rho|MAJ_{JW,y}|k\sigma\rangle\mathcal{I}_a\} = \{\gamma_{j,\sigma,x}, \gamma_{k,\rho,y}\} = 2\delta_{xy}\delta_{jk}\delta\sigma\rho. \quad (52)$$

Following the work by Babbush et al. [6], the cost of this Majorana circuit, which encodes 2N different Majorana operators, is $Cost_{MAJ,2N}=8(N-1)$ T gates. Moreover, the cost of a controlled Majorana circuit $$|0\rangle\langle 0|\otimes\rangle+|1\rangle\langle 1|\otimes MAJ_x, \quad (53)$$

is also 8(N−1) T gates. In the following, the JW subscript on Majorana circuits is dropped, for it matters only that they represent Majorana operators.

New Quantum Circuit Primitives

Described in this section are some new quantum circuit primitives used in the methods herein.

Programmable rotation-gate array. Presented in this subsection is an implementation of the multiplexed single-qubit Z-rotation gate that will be useful later on. Given a list of N angles $\vec{\theta}$ where each $$\theta_k = \sum_{b=0}^{\beta-1} \theta_{k,b}/2^{1+b} \in [0, 1-2^{-\beta}]$$

For brevity, let $R_b = e^{i2\pi Z/2^{1+b}}$, and $R_{-1}^\theta = e^{i2\pi\theta Z}$. In this approach, a data register is defined with κ qubits that will store κ bits of $\theta_k$. Let $\vec{\theta}_{k,[\mu:\mu+\kappa-1]} = (\theta_{k,\mu}, \theta_{k,\mu+1}, \ldots, \theta_{k,\mu+\kappa-1})$. Defined now is the data-lookup oracle that outputs κ contiguous bits of $\theta_k$, conditioned on index k.

$$\begin{array}{c} |k\rangle_a \xrightarrow{\phantom{xx}} \boxed{k} \xrightarrow{\phantom{xx}} |k\rangle_a \\ |z\rangle_s \xrightarrow{\phantom{/\kappa}} \boxed{\vec{\theta}_{k,[\mu:\mu+\kappa-1]}} \xrightarrow{\phantom{xx}} |z \oplus \theta_{k,\mu}\theta_{k,\mu+1}\cdots\theta_{k,\mu+\kappa-1}\rangle_s. \end{array} \quad (55)$$

Then eq 54 is implemented by the following circuit.

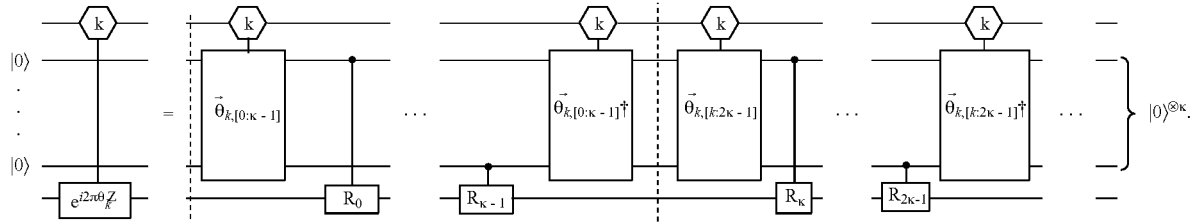
(56)

With only κ qubits, clearly ⌈b/κ⌉ slices of the circuit within the dotted regions are required. Note that the middle pair of data-lookup oracles in the $j^{th}$ slice can be merged also into one that writes the bits $\vec{\theta}_{k,[j\kappa:(j+1)\kappa-1]} \oplus \vec{\theta}_{(k),[(j+1)\kappa:(j+2)\kappa-1]}$. Accounting for this merging, this circuit applies ⌈b/κ⌉+1 data-lookup oracles each storing at most κ entries.

attnAnother useful situation is arbitrary unitaries are applied on the system register are interspersed between M multiplexed rotations.

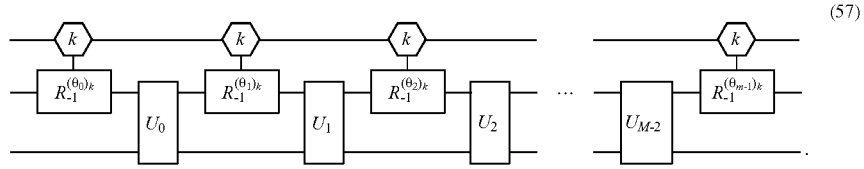
(57)

The same construction as in eq 56 may now be used to implement the above. The number of data-lookup oracles required is then M⌈b/κ⌉+1. This may be reduced to just ⌈Mb/κ⌉+1. When b is not an integer multiplier of κ, the data-lookup in the last slice might store fewer than κ entries. These empty entries are thus filled with bit-strings from the nest data-lookup. This filling procedure is illustrated by the following example, where the bits of precision b=2≤κ=3.

In the case where many data qubits are available κ≫b, multiple bit-strings may similarly be merged into the same lookup oracle. Thus, $$\text{Cost of } eq\ 57 = \lceil Mb/\kappa + 1 \rceil \hbar \text{ data lookup oracles,} \tag{59}$$

with K bit-strings of length κ+all of the $U_j$. Qubits required for data and index k=κ+⌈log₂(M)⌉.

It is valuable to express cost in eq 59 with respect to a tunable number of qubits κ. According to [10], the T gate cost of data-lookup with K elements that outputs κ bits an be reduced by using λ dirty qubits. When these qubits are dirty, the T cost is $$8K \Big/ \Big\lfloor + \frac{\lambda}{\kappa} \Big\rfloor + O(\lambda).$$

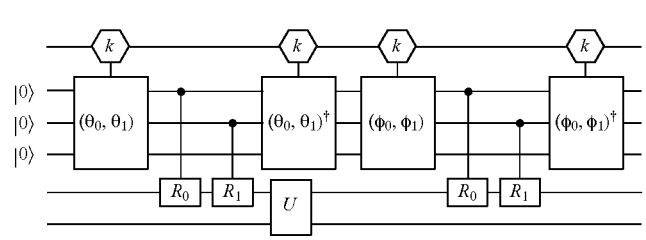

(58)

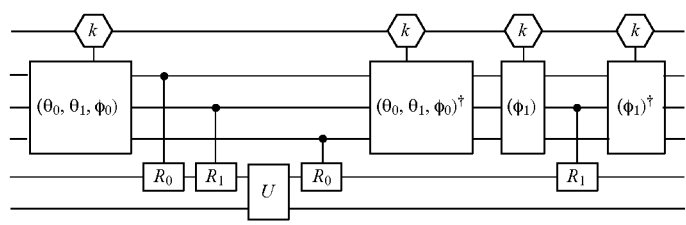

Thus the T count of all the data-lookup oracles is $$\left\lceil \frac{Mb}{\kappa} + 1 \right\rceil \left( 8K / \left\lfloor 1 + \frac{\lambda}{\kappa} \right\rfloor + O(\lambda) \right), \tag{60}$$

which is minimized by choosing $\lambda \sim \sqrt{K\kappa}$.

Yet another useful situation is where the unitary $U_j$ is drawn some set of J element, the choice is some function $j=f(k)$ controlled by the system register.

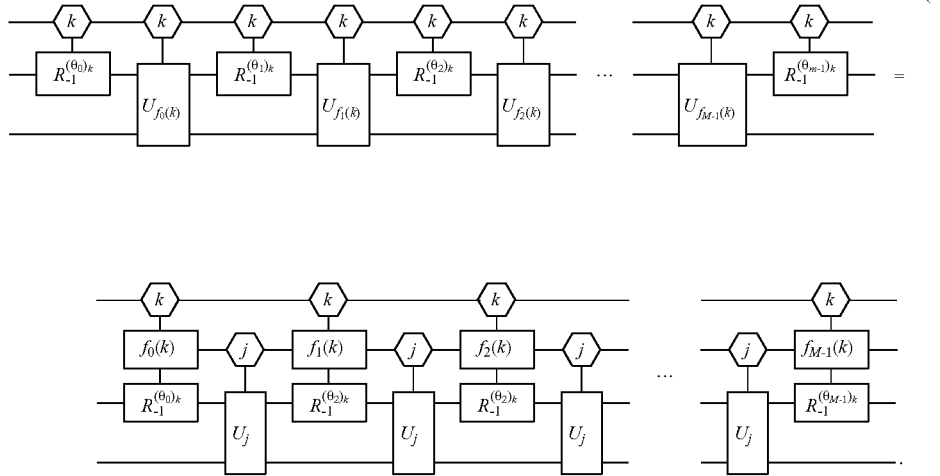

(61)

This is implemented by a modification of eq 56. Here, is defined the lookup oracle for the rotation angles to also output the $\lceil \log_2 J \rceil$ bits of the function $f(k)$. It should be clear that the merging procedure in eq 58 is applicable to the bits of $f(k)$. The only difference is that the bit-string $f(k)$ cannot be split across multiple lookup oracles for a general multiplexed unitary $U_j$.

$$\text{Cost of } eq\,61 = \left\lceil M \frac{b + \lceil \log_2 J \rceil}{\kappa} \right\rceil + 1 \text{ data lookup oracles,} \tag{62}$$

with K elements +(M−1) multiplexed $U_j$. Qubits required for data and index $k=\kappa+\lceil \log_2(M) \rceil$ assuming $\kappa > \lceil \log_2 J \rceil$.

It is valuable to express cost in eq 59 and eq 62 with respect to a tunable number of qubits κ. According to [10], the T gate cost of data-lookup with K elements that outputs b bits an be reduced by using λ dirty qubits. When these qubits are dirty, the T cost is $$8K / \left\lfloor 1 + \frac{\lambda}{b} \right\rfloor + O(\lambda).$$

Thus the T count of all the data-lookup oracles is $$\left\lceil \frac{Mb}{\kappa} + 1 \right\rceil \frac{KMb^2}{8\kappa\lambda} + \Theta\left( b\left( K\frac{1}{\lambda} + M\frac{\lambda}{\kappa} \right) \right). \tag{63}$$

So long as $\lambda \leq \sqrt{Kb}$ and $\kappa \leq Mb$, this is minimized by choosing $\kappa = \lambda$. Thus Cost of $eq\,61 =$ $$\frac{KMb^2}{8\kappa^2} + \Theta\left( b\left( K\frac{1}{\kappa} + M \right) \right) T \text{ gates } + (M-1) \text{ multiplexed } U_j,$$

Qubits required for data and index $k=2\kappa+\lceil \log_2(M) \rceil$, assuming $\kappa > \lceil \log_2 J \rceil$. (64)

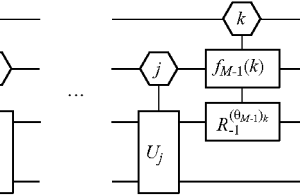

It is now possible to bound the bits of precision required to approximate eq 57 to an overall error of ∈ in the spectral norm. Suppose that real-numbered angles $\vec{\theta_{exact}}$ are given. Then the error of approximating each angle $\theta_{exact,k}$ with a β-bit number $\theta_k$ is at most $2^{-\beta-1}$. Thus the error of each rotation compared to its binary approximation is $\|R_{-1}^{\theta_{exact,k}} - R_{-1}^{\theta_k}\| \leq \|R^{2-\beta-1} - \mathcal{I}_a\| = \|\cos(2^{-\beta}\pi) - i \sin(2^{-\beta}\pi)Z - \mathcal{I}_a\| = \sqrt{(\cos((2^{-\beta}\pi)-1)^2 + \sin^2(2^{-\beta}\pi)} = \sqrt{2}|\sin(2^{-\beta}\pi)| \leq \pi 2^{-\beta+1/2}$. The cumulative error $\in \leq M\pi 2^{-\beta+1/2}$ of all rotations then follows by the triangle inequality on unitary operators $\|(\Pi_j U_j) - (\Pi_j \tilde{U}_j)\| \leq \Sigma_j \|U_j - \tilde{U}_j\|$. Thus the bits of precision required is $$\beta = \left\lceil \frac{1}{2} + \log_2\left(\frac{M\pi}{\epsilon}\right) \right\rceil. \tag{65}$$

There can be an additional error introduced from approximating each single-qubit rotation gate with Clifford+T gates. However, using the phase gradient technique [12] eliminates this error with a worst-case cost of 4 T gates per $R_b$ rotation.

Multiplexed sparse data-lookup. Described in this subsection is an implementation of a multiplexed data-lookup oracle. This can be non-trivial as standard data-lookup constructions [6, 10] are controlled by a single index register. Whereas in this case, there can be two or more index registers such as below.

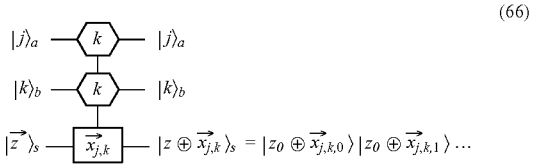
(66)

In the above, $j \in [J]$ and $k \in [K]$. Thus there are at most $KJ$ bit-strings $\vec{x}_{j,k}$. One solution is to map the indices $(j, k)$ to a unique integer $q=jK+k$. Thus eq 66 can be implemented by a data-lookup oracle controlled by a single index $q \in [JK]$, combined with an arithmetic circuit that computes q from j and k as follows:

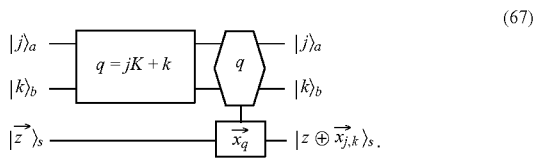
(67)

Considered now is the situation where for each j, only $K_j \leq K$ bit-strings are defined. Thus the multiplexed data-lookup oracle only encodes $Q=\Sigma_{j \in [J]} K_j$ elements. Using the construction of eq 67 is wasteful as it enumerates over $KJ$ elements, which is more than necessary. One solution uses a data-lookup oracle that enumerates over exactly Q elements. The basic idea is to map (j, k) to a unique integer $q=k+\Sigma_{\alpha \in [j-1]} K_\alpha$. Note that the shift $Q_j=\Sigma_{\alpha \in [j-1]} K_\alpha$ can be classically pre-computed. Thus this map is implemented by a data-lookup oracle that outputs $Q_j$, followed by an arithmetic circuit that adds k to $Q_j$ as follows.

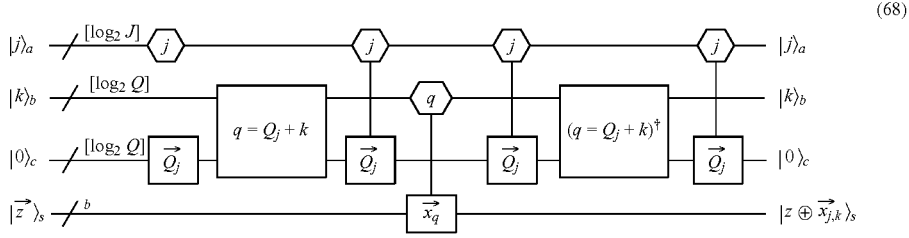 [SMILES: C1CCCCC1 ; C1CCCCC1 ; C1CCCCC1 ; C1CCCCC1 ; C1CCCCC1]
(68)

This construction is particularly advantageous when additional ancilla qubits are used to reduce the T gate count, similar to eq 64.

Lemma 7. Multiplexed sparse data-lookup oracle. Given a set of bit-strings $\{\vec{x}_{j,k} \in \{0,1\}^b : j \in [N]$ and $k \in [K_j]\}$, the data-lookup oracle in eq 66 can be implemented using one application of any data-lookup oracle for $Q=\Sigma_{j \in [J]} K_j$ bit-strings of length b, two applications of any data-lookup oracle for J bit-strings of length $\lceil \log_2(Q) \rceil$, and two $\lceil \log_2(Q) \rceil$-bit arithmetic adders.

Corollary 1. Multiplexed sparse data-lookup oracle with dirty qubits. The data-lookup oracle in 3 can be implemented using Register qubits: $b+n_J+n_Q$.
Clean qubits: $n_Q$ $n_J$.
Dirty qubits: $\lambda$.
T gates: $4\,\text{DATA}_{J,n_Q,n_Q+b+\lambda} + \text{DATA}_{Q,b,2n_J+\lambda} + 16n_Q + \mathcal{O}(1)$.

Proof. Suppose that $n_J$ clean qubits and $\lambda$ dirty qubits are allocated at the beginning of the circuit. The resources required for each operation, to ensure that there are sufficient clean qubits available, may now be tabulated, together with the corresponding sum of the T gate counts.

| Operation | Clean qubits required | Clean qubits available | Dirty qubits available ($n_d$) | T gates |
|---|---|---|---|---|
| Lookup on $\vec{Q}_j$ 3 | $n_J$ | $n_J$ | $n_Q + b + \lambda$ | $\text{DATA}_{J,n_Q,n_d}$ |
| Adder [13] | 0 | n/a | n/a | $8n_Q + \mathcal{O}(1)$ |
| Lookup on $\vec{x}_q$ 3 | $n_Q$ | $n_Q$ | $2n_J + \lambda$ | $\text{DATA}_{Q,b,n_d}$ |

In most applications, the total number of bit-strings Q is significantly larger than J. Thus the cost of 7 is dominated by $$\text{DATA}_{Q,b,2n_J+\lambda} + \mathcal{O}(n_Q + \text{DATA}_{J,n_Q,n_Q+b+\lambda}) \qquad (69)$$

This multiplexed data-lookup oracle can also be used to multiplex sparse state preparation with garbage in Lemma 5.

Block-Encoding of Single-Factorized Hamiltonian

Described in this section is the block-encoding of the single-factorized Hamiltonian in Theorem 1. The focus here is on the two-body term, which is the most costly component.

$$\text{Two} = \sum_{r \in [R]} \Lambda^{(r)} T_2[\text{One}_{L^{(r)}}], \qquad (70)$$

$$\text{One}_L = \frac{i}{2} \sum_{ij \in [N]} \sum_{\sigma \in [0,1]} L_{ij} \gamma_{i,\sigma,0} \gamma_{j,\sigma,1},$$

$$\Lambda^r_{EW} = \Lambda^{(r)} \|L^{(r)}\|^2_{EW}$$

At a high level, this block-encoding is achieved using the following circuit identities, which should be self-explanatory in view of the definitions from the 'Preliminaries' section above.

(71)

Add block-encodings eq 35:

$$\mathcal{B}\left[\frac{\text{Two}}{2\|\Lambda_{EW}\|_1}\right] =$$

$$|\overrightarrow{\Lambda_{EW}}\rangle \;\; r \;\; |\overrightarrow{\Lambda_{EW}}\rangle^\dagger$$

$$\mathcal{B}\left[T_2\left[\frac{\text{One}_{L^{(r)}}}{2\|L^{(r)}\|_{EW}}\right]\right],$$

-continued

Qubitization eq 48:

$$\mathcal{B}\left[T_2\left[\frac{\text{One}_{L^{(r)}}}{2\|L^{(r)}\|_{EW}}\right]\right] = $$

$$\mathcal{B}\left[\frac{\text{One}_{L^{(r)}}}{2\|L^{(r)}\|_{EW}}\right] - \text{REF} - \mathcal{B}\left[\frac{\text{One}_{L^{(r)}}}{2\|L^{(r)}\|_{EW}}\right]^\dagger ,$$

(72)

Add block-encodings eq 35:

$$\mathcal{B}\left[\frac{\text{One}_{L^{(r)}}}{2\|L^{(r)}\|}\right]_{EW} = $$

(73)

where $|L^{(r)}\rangle = \sum_{ij\in[N]} \sqrt{\frac{|L_{ij}^{(r)}|}{\|L^{(r)}\|_{EW}}} |i\rangle|j\rangle.$ (74)

The multiplexed unitary preparing all the quantum states $|L^{(r)}\rangle$ has a T gate cost that is at most $4\Sigma_{r\in[R]} \text{nnz}[L_{LT}^{(r)}] + \mathcal{O}(\log RN/\epsilon)$. As $L^{(r)}$ is symmetric $$\text{nnz}[L_{LT}^{(r)}] \leq \frac{N}{2}(N+1)$$

counts the number of non-zero elements in its lower triangular portion. One straightforward technique to prepare $|L^{(r)}\rangle$ uses the state preparation technique in eq 41. This proceeds in three steps. First, flatten the non-zero lower triangular elements of $L_{LT}^{(r)}$ into a three arrays $(\vec{L}^{(r)}_{LT}, \vec{i}, \vec{j})$ each of length $\text{nnz}[L_{LT}^{(r)}]$. Each element of $\vec{L}^{(r)}_{LT}$ stores the value of $L_{LT}^{(r)}$, whereas $\vec{i}$ and $\vec{j}$ store the corresponding row and column index. Second, the state $|\vec{L}^{(r)}_{LT}\rangle$ is prepared, together with additional bits $\vec{i}$ and $\vec{j}$ and a bit that flags whether $i\neq j$, as follows:

(75)

$$\sum_{x\in[\text{nnz}[\vec{L}_{LT}^{(r)}]]} \sqrt{\frac{|(\vec{L}_{LT}^{(r)})_x|}{\|h\|_{EW}}} |i_x\rangle_a |j_x\rangle_b |i_x\neq j_x\rangle_c |x\rangle_d = $$

$$\sum_{i\in[N]} \sqrt{\frac{|L_{ii}^{(r)}|}{\|h\|_{EW}}} |i\rangle_a |j\rangle_b |0\rangle_c |Garbage_{ii}\rangle_d + $$

$$\sum_{i>j\in[N]} \sqrt{\frac{2|L_{ij}^{(r)}|}{\|h\|_{EW}}} |i\rangle_a |j\rangle_b |1\rangle_c |Garbage_{ij}\rangle_d.$$

Third, the superposition over lower triangular elements is expanded to the full $L^{(r)}$ using the following circuit.

(76)

$$\sum_{ij\in[N]} \sqrt{\frac{|L_{ij}^{(r)}|}{\|L^{(r)}\|_{EW}}} |i\rangle_a|j\rangle_b|Garbage_{ij}\rangle_{cde}.$$

Note that the last quantum gate swaps registers a and b controlled on the two-qubit state $|11\rangle_{de}$. As discussed after eq 44, these garbage states may be safely ignored in the block-encoding framework.

Theorem 3. Block-encoding single-factorized Hamiltonian. For any $\lambda\geq 1$; $\mu\geq 1$ an $2^{1-\mu}$-approximate block encoding $$\mathcal{B}_{2^{1-\mu}}\left[\frac{\text{Two}}{2\|\vec{\Lambda}_{EW}\|_1}\right]$$

or the two-electron term in Theorem 1 up to an additive identity offset costs at most

- T gates: $\leq 32Q\left/\left[1 + \frac{1}{2}\frac{(\lambda+n_R)+2N}{\mu+2n_N}\right]\right. + \mathcal{O}(\lambda + N\,\log(N/\epsilon)).$
- Register qubits: $2N$.
- Clean qubits: $2\mu + n_R + n_Q + 4n_N + \mathcal{O}(1)$.
- Dirty qubits: $\lambda$.

Proof. Let $$M = \frac{N}{2}(N+1),$$

and $Q = \Sigma_{r\in[R]} \text{nnz}\,[L_{LT}^{(r)}] \leq RM$ be the total number of non-zero elements. In addition to the $n_R + 2n_N + 2N + 1$ qubits visible in eq 71, eq 72, and eq 73, $n_{Q+}\mathcal{O}(1)$ clean qubits and $2\mu$, $2n_N$ garbage qubits necessary to implement intermediate operations are allocated. It is further assumed that $\lambda$ additional dirty qubits are available to reduce the T gate count of data-lookup. The resources required for each step of the block-encoding are now examined. In eq 73, the Majorana circuits use 16N T gates and $n_N \leq v$ clean qubits. $|L^{(r)}\rangle$ is prepared using 4. The dominant cost there is data-lookup over $\text{nnz}[L_{LT}^{(r)}] \leq M$ bit-strings of length $2\mu$, $4n_N$ that store the coefficient data and the indices of $L_{ij}^{(r)}$. The cost of the other components are negligible: comparing $i \neq j$ and implementing the controlled-swaps costs $\mathcal{O}(n_N)$ T gates.

The multiplexed state preparation of $|L^{(r)}\rangle$ multiplexes these data-lookup oracles, which are implemented using Lemma 7. That method applies data-lookup over Q bit-strings of length $2\mu+4n_N$, data-lookup over R bit-strings of length $n_Q$, and integer arithmetic with a negligible cost of $8n_Q$ T gates. The data-lookup oracle is implemented over R bit-strings using $n_R$ clean qubits and $\sqrt{Rn_Q} = \rangle(N \log (N))$ dirty qubits, using the fact that at least 2N qubits are always available as dirty qubits. The data-lookup oracle is implemented over Q bit-strings using $n_Q$ clean qubits, and at least $\lambda+n_R+2N$ dirty qubits. Thus the total cost of eq 73 is at most $$T \text{ gates } \leq 2\left(DATA_{Q,2\mu+4n_N,\lambda+n_R+2N} + 4\ DATA_{r,n_Q,\sqrt{Rn_Q}}\right) + \quad (77)$$

$$O(N + R\mu + R\ \log(Q/\epsilon)) =$$

$$16Q \bigg/ \left[\left(1 + \frac{1}{2}\frac{(\lambda+n_R)+2N}{\mu+2n_N}\right)^{-1}\right] + O(\lambda + N\ \log(N/\epsilon)).$$

In eq 72, the circuit in eq 71 is applied twice, and a reflection that costs $\rangle(\log N/\in)$ T gates. In eq 71, the state $|\vec{\Lambda_{EW}}\rangle$ has only R coefficients and is cheap to prepare. Thus the less efficient but simpler method by Shende et al. [11] is applied, which uses $\rangle(N \log(N/\in))$ T gates and no ancilla qubits. The total cost is then $$T \text{ gates } \leq 32Q \bigg/ \left[1 + \frac{1}{2}\frac{(\lambda+n_R)+2N}{\mu+2n_N}\right] + O(\lambda + N\ \log(N/\epsilon)). \quad (78)$$

Determined now is the error of block-encoding due to approximate state preparation. Errors $\in$ are introduced by synthesizing $\rangle(N)$ arbitrary single-qubit rotations with a finite sequence of T gates. However, $\in$ may be ignored, as it may be made arbitrarily small using $\rangle(N \log (N/\in))$ T gates, which is a sub-dominant cost, and without using any additional qubits. From 6, using $\mu$ bits of precision block-encodes $$\mathcal{B}_{2^{-\mu}}\left[\frac{L^{(r)}}{\|L^{(r)}\|_{EW}}\right] = \mathcal{B}\left[\frac{\tilde{L}^{(r)}}{\|L^{(r)}\|_{EW}}\right],$$

where $$\left\|\frac{L^{(r)}}{\|L^{(r)}\|_{EW}} - \frac{\tilde{L}^{(r)}}{\|L^{(r)}\|_{EW}}\right\| \leq 2^{-\mu}.$$

Qubitization then block-encodes $$T_2\left[\frac{\tilde{L}^{(r)}}{\|L^{(r)}\|_{EW}}\right] = 2\left(\frac{\tilde{L}^{(r)}}{\|L^{(r)}\|_{EW}}\right)^2 - \mathcal{I}.$$

Using the triangle inequality $\|AB-A'B'\|-\|AB-AB'+AB'-A'\| \leq \|A\|\ \|B-B'\|+\|A-A'\|\ \|B'\|$, the error $$\left\|\left(\frac{\tilde{L}^{(r)}}{\|L^{(r)}\|_{EW}}\right)^2 - \left(\frac{L^{(r)}}{\|L^{(r)}\|_{EW}}\right)^2\right\| \leq \quad (79)$$

$$\left(\left\|\left(\frac{L^{(r)}}{\|L^{(r)}\|_{EW}}\right)\right\| + \left\|\left(\frac{\tilde{L}^{(r)}}{\|L^{(r)}\|_{EW}}\right)\right\|\right)\left\|\frac{\tilde{L}^{(r)}}{\|L^{(r)}\|_{EW}} - \frac{L^{(r)}}{\|L^{(r)}\|_{EW}}\right\| \leq 2^{1-\mu}.$$

Taking a linear combination of these with the state $|\vec{\Lambda}_{EW}\rangle$ then forms an approximate block-encoding $$\mathcal{B}_{2^{1-\mu}}\left[\frac{\text{Two}}{2\|\vec{\Lambda}_{EW}\|_1}\right].$$

Block-Encoding of Double-Factorized Hamiltonian

Described in this section is the block-encoding of the double-factorized Hamiltonian in eq 23. The focus here is on the two-body term, which is the most costly component.

$$\text{Two} = \sum_{r \in [R]} \Lambda^{(r)} T_2\left[\frac{1}{2}\sum_{k \in [M^{(r)}]} \lambda_k^{(r)} \sum_{\sigma \in \{0,1\}} \gamma_{\vec{R}_k^{(r)},\sigma,0}\gamma_{\vec{R}_k^{(r)},\sigma,1}\right], \quad (80)$$

$$\gamma_{\vec{u},\sigma,x} = \sum_{j \in [N]} u_j \gamma_{j,\sigma,x},$$

$$\Lambda_{SH}^r = \Lambda^{(r)}\|L^{(r)}\|_{SC}^2.$$

At a high level, this block-encoding is achieved using the following circuit identities, which should be self-explanatory in view of the definitions from the 'Preliminaries' section above.

Add block-encodings eq 35: (81)

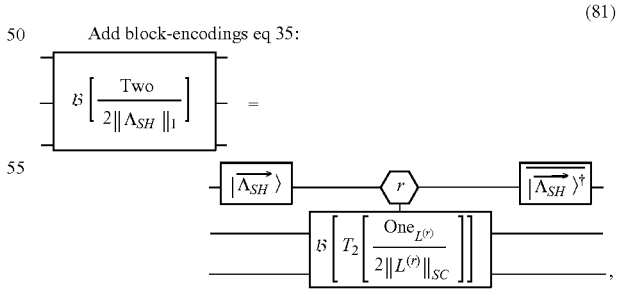

Qubitization eq 48: (82)

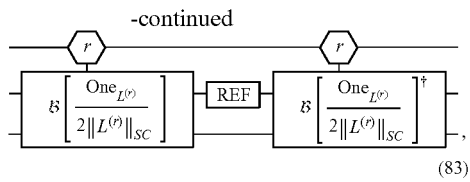
(83)

Add block-encodings eq 35:

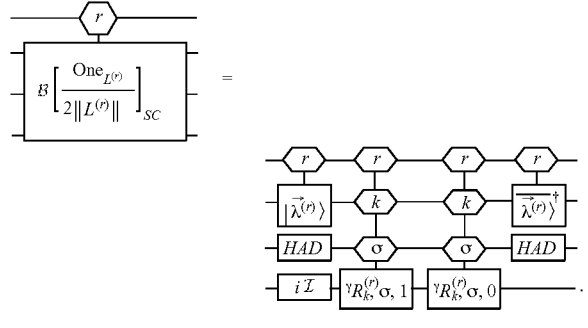

Note that the operator $$\gamma_{\vec{R}_k^{(r)}, \sigma, x}$$

is also unitary thus is trivially its own block-encoding $$\mathcal{B}\left[\gamma_{\vec{R}_k^{(r)}, \sigma, x}\right],$$

following eq 33.

The main innovation here is the synthesis of the multiplexed Majorana operator $$\gamma_{\vec{R}_k^{(r)}, \sigma, x} \gamma_{\vec{R}_k^{(r)}, \sigma, x}.$$

The multiplexed Majorana operator is synthesized by transforming $\gamma_{0,\sigma,x}$ to $$\gamma_{\vec{R}_k^{(r)}, \sigma, x}$$

by conjugating with a sequence of unitary rotations. The multiplexed version of this sequence will be shown to match the form of the programmable rotation gate arrays in the 'Programmable rotation-gate array' subsection above. From this result the gate and qubit complexity are readily obtained. The required sequence of unitary rotations follows from the following observation.

Lemma 8. Sum of Majorana operators by Majorana rotations. Let the unitary $U_{\vec{u}}$ be the sequence $$U_{\vec{u}} = V_{\vec{u},0} \ldots V_{\vec{u},1} \ldots V_{\vec{u},N-1}, \quad V_{\vec{u},p} \doteq e^{\theta_p \gamma_p \gamma_{p+1}} \qquad (84)$$

Then there exists rotation angles $\theta_j = \theta_{\vec{u},j}$ that are function of $\vec{u}$ such that $U_{\vec{u}}^\dagger \cdot \gamma_0 \cdot U_{\vec{u}} = \gamma_{\vec{u}} = \mathcal{B}[\gamma_{\vec{u}}]$.

(85)

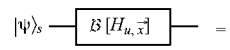

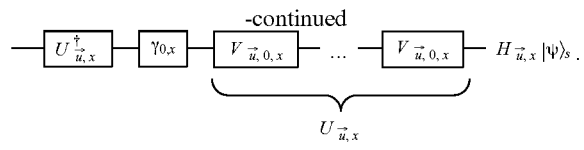

Proof. By taking a Taylor series expansion, observe that $V_p = \cos(\theta) I_a + \sin(\theta) \gamma_p \gamma_{p+1}$. Thus $$V_p^\dagger \gamma_q V_p = \begin{cases} \gamma_q, & q \neq p, p+1, \\ \cos(2\theta_p)\gamma_p + \sin(2\theta_p)\gamma_{p+1}, & q = p, \\ \cos(2\theta_p)\gamma_p - \sin(2\theta_p)\gamma_{p+1}, & q = p+1 \end{cases} \qquad (86)$$

Thus $$U_{\vec{u}}^\dagger \cdot \gamma_0 \cdot U_{\vec{u}} = \sum_{p \in [N]} u_p \gamma_p, \text{ by choosing} \qquad (87)$$

$$u_0 = \cos(2\theta_0), \; u_1 = \sin(2\theta_0)\cos(2\theta_1), \ldots,$$
$$u_p = \cos(2\theta_p) \prod_{j<p} \sin(2\theta_j).$$

The angles $\theta_p$ are obtained by recursively solving this linear chain of equations.

The multiplexed version of eq 85 is then (88)

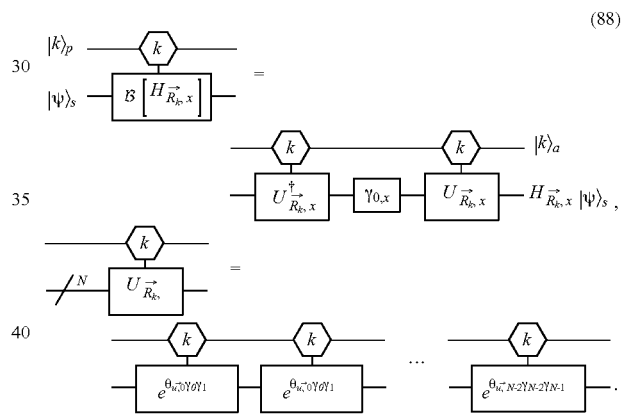

In a Pauli representation of the Majorana operators, each rotation $V_{\vec{u},p}$ reduces to a single-qubit Z rotation by angle $\theta_{\vec{u},p}$ conjugated by some Clifford gate $C_p$ such that $C_p^\dagger \cdot Z \cdot C_p = \gamma_{p,0,0} \gamma_{p+1,0,0}$, such as (89)

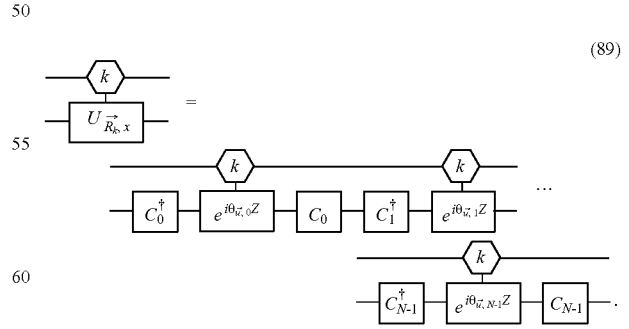

For instance, the Jordan-Wigner representation of eq 51 (momentarily ignoring the spin index) maps $$\gamma_{p,0}\gamma_{p+1,0} \to iY_p X_{p+1}, \; \gamma_{p,1}\gamma_{p+1,1} \to iX_p Y_{p+1}. \qquad (90)$$

In the example where N=4, the circuit eq 88 is therefore

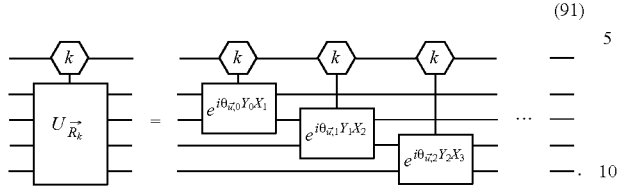
(91)

These multi-qubit rotations are transformed into single-qubit rotations using local Clifford gates such as

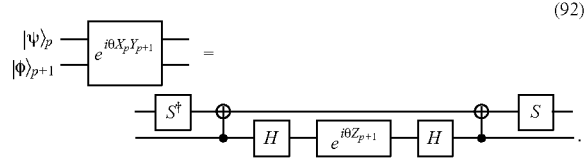
(92)

Observe that the circuit which combines eq 92 with eq 91 matches the programmable rotation gates in eq 57. Note that the same sequence of rotation angles may be used to simultaneously map $\gamma_{0,\sigma,x} \to \gamma_{0,\sigma,x}$ for both spin components $\sigma \in 0,1$ and both $x \in \{0, 1\}$. The Majorana operator $\gamma_{0,\sigma,x}$ is now conjugated, controlled on $\sigma$, with the sequence of rotations in eq 91 acting on both spin up and spin down registers. This circuit in the example of N=4 is as follows.

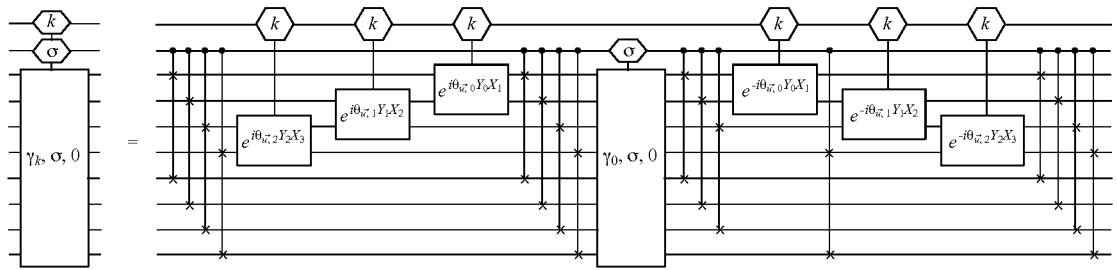
(93)

The resources required for block-encoding Theorem 2 are thus obtained.

Theorem 4. Block-encoding double-factorized Hamiltonian. For any $\lambda \geq 1$, $N-1 \geq \kappa \geq 1$, a $\epsilon$-approximate block encoding $$\mathcal{B}_\epsilon\left[\frac{\text{Two}}{2\|\vec{\lambda}_{SH}\|_1}\right]$$

of the two-electron term in Theorem 1 up to an additive identity offset costs at most $$T \text{ gates: } \leq 64 \sum_{r \in [R]} NM^{(r)}\left(\frac{\mu+1}{\lambda+\kappa+2N+n_R}\right) + O\left(\frac{N\mu}{\kappa}(\lambda+N)\right).$$

Register qubits: $2N$.

Clean qubits: $\kappa + 2\mu + n_R + n_Q + n_N + O(\log(1/\epsilon))$.

Dirty qubits: $\lambda$.

Above, $$\mu = \left\lceil \frac{1}{2} + \log_2\left(\frac{8N\pi}{\epsilon}\right) \right\rceil.$$

Proof. Let $Q = N\Sigma_{r\in[R]}M^r \leq RN^2$ be the total number of non-zero elements. In addition to the $n_R+n_N+2N+1$ qubits visible in eq 81, eq 82 and eq 83, $n_Q+\kappa+ O(1)$ clean qubits are allocated, where $1 \leq \kappa \leq N-1$, and $\mu+n_N$ garbage qubits necessary to implement intermediate operations. It is further assumed that $\lambda$ additional dirty qubits are available to reduce the T gate count of data-lookup. The resources required for each step of the block-encoding are now examined. The circuit in eq 93 is multiplexed by $|r\rangle$. In this circuit, T gates are used to apply 4N controlled swaps and two programmable gate arrays on $\Sigma_{r\in[R]}M^{(r)}$ elements with (N−1) rotations, each specified to $\mu$ bits of precision. Using the phase gradient technique [12], the (2N−2)$\mu$, single-qubit rotations cost $\leq 8N\mu$ T gates. The multiplexed sparse data-lookup oracle from Lemma 7 is now used to write the rotation angles. From eq 60 and eq 77 the T gate cost of all these components are $$2\left[\frac{(N-1)\mu}{\kappa}+1\right]\left(DATA_{\Sigma_{r\in[R]}M^{(r)},\kappa,\lambda+2N+n_R} + 4DATA_{R,n_Q}\cdot\sqrt{Rn_Q}\right) + \quad (94)$$

$$O(N\mu) \leq \left\lceil\frac{(N-1)\mu}{\kappa}+1\right\rceil\left(\frac{16\sum_{r\in[R]}M^{(r)}}{\left[1+\frac{\lambda+2N+n_R}{\kappa}\right]}\right) + O\left(\frac{N\mu}{\kappa}(\lambda+N)\right) \leq$$

$$16\sum_{r\in[R]}NM^{(r)}\left(\frac{\mu+1}{\lambda+\kappa+2N+n_R}\right) + O\left(\frac{N\mu}{\kappa}(\lambda+N)\right).$$

In eq 83, the multiplexed Majorana operators are applied twice. Using at least 2N dirty qubits reduces the cost of multiplexed preparation of $|\vec{\lambda}^{(r)}\rangle$ to b bits of precision to at most $O(Nb)$ T gates. In eq 82, the multiplexed block-encoding of One$_{L^{(r)}}$ is applied twice. The reflection about $O(\log N/\epsilon)$ qubits has negligible cost. In eq 82, $|\overrightarrow{\Lambda SH}\rangle$ is prepared, which costs at most $O(N \log (N/\epsilon))$ T gates.

Determined now is the error of block-encoding due to approximate state preparation and approximating the rotation angles with binary numbers. From the 'Programmable rotation-gate array' subsection, using $$\mu = \left\lceil \frac{1}{2} + \log_2\left(\frac{(N-1)\pi}{\epsilon}\right) \right\rceil$$

bits of precision approximates the ideal programmable gate array to error $\epsilon$. This error is increased eightfold to $8\epsilon$ as eq 81 applies this gate array eight times. There are additional errors from approximate state preparation of $|\vec{\lambda}^{(r)}\rangle$ and $|\vec{\Lambda_{sH}}\rangle$, but those may be ignored as they may be made arbitrarily small with a sub-dominant T gate contribution. An $8\epsilon$-approximate block-encoding $$\mathcal{B}_{8\epsilon}\left[\frac{\text{Two}}{2\|\Lambda_{sH}\|_1}\right]$$

is thus obtained.

Appendix: Proof of Theorem 1

Presented in this section is an improved block-encoding of the two-electron terms. Using the Majorana representation from eq 19, some useful identifies are $$a^\dagger_{(i,\sigma)}a_{(i,\sigma)} = \frac{1}{2}(\mathcal{I} + i(\gamma_{i,\sigma,0}\gamma_{i,\sigma,1})), \text{ where} \quad (95)$$

$$i \neq j: a^\dagger_{(i,\sigma)}a_{(j,\sigma)} + h.c. = \frac{i}{2}(\gamma_{i,\sigma,0}\gamma_{j,\sigma,1} - \gamma_{i,\sigma,1}\gamma_{j,\sigma,0}) \quad (96)$$

Thus any one-electron Hamiltonian has the Majorana representation $$\sum_{i,j,\sigma} h_{i,j} a^\dagger_{(i,\sigma)}a_{(j,\sigma)} = \sum_\sigma \left(\sum_i h_{ii}a^\dagger_{(i,\sigma)}a_{(i,\sigma)} + \sum_{i\neq j} h_{i,j}a^\dagger_{(i,\sigma)}a_{(j,\sigma)}\right) \quad (97)$$

$$= \sum_\sigma \left(\sum_i h_{ii}\frac{1}{2}(\mathcal{I} + i(\gamma_{i,\sigma,0}\gamma_{i,\sigma,1}) + \frac{i}{2}\sum_{i>j}h_{i,j}(\gamma_{i,\sigma,0}\gamma_{j,\sigma,1} - \gamma_{i,\sigma,1}\gamma_{j,\sigma,0})\right)$$

$$= \sum_\sigma \left(\sum_i h_{ii}\frac{1}{2}(\mathcal{I} + i(\gamma_{i,\sigma,0}\gamma_{i,\sigma,1}) + \frac{i}{2}\sum_{i>j}h_{i,j}(\gamma_{i,\sigma,0}\gamma_{j,\sigma,1} + \gamma_{j,\sigma,1}\gamma_{i,\sigma,0})\right)$$

$$= \sum_\sigma \left(\sum_i h_{ii}\frac{1}{2}(\mathcal{I} + i(\gamma_{i,\sigma,0}\gamma_{i,\sigma,1}) + \frac{i}{2}\sum_{i\neq j}h_{i,j}(\gamma_{i,\sigma,0}\gamma_{j,\sigma,1})\right)$$

$$= \sum_\sigma \left(\sum_i h_{ii}\frac{1}{2}\mathcal{I} + \frac{i}{2}\sum_{i,j}h_{i,j}(\gamma_{i,\sigma,0}\gamma_{j,\sigma,1})\right)$$

$$= \sum_i h_{ii}\mathcal{I} + \frac{i}{2}\sum_{i,j,\sigma}h_{i,j}(\gamma_{i,\sigma,0}\gamma_{j,\sigma,1}).$$

Also note the spectral norm identity $$\left\|\sum_{ij}h_{i,j}(\gamma_{i,\sigma,0}\gamma_{j,\sigma,1})\right\| = \|h\|_F. \quad (98)$$

By substituting the Majorana representation into the Hamiltonian of eq 15, its components $H = H_1 + H_2$ are obtained.

$$H_1 = \sum_{i,j,\sigma}\tilde{h}_{i,j}a^\dagger_{(i,\sigma)}a_{(j,\sigma)} = \underbrace{\sum_i \tilde{h}_{ii}\mathcal{I}}_{I_{H_1}} + \underbrace{\frac{i}{2}\sum_{i,j,\sigma}\tilde{h}_{i,j}(\gamma_{i,\sigma,0}\gamma_{j,\sigma,1})}_{M_{H_1}}, \quad (99)$$

$$H_2 = \frac{1}{2}\sum_{r=1}^R \Lambda^{(r)}\left(\sum_{i,j,\sigma}L^{(r)}_{(i,j)}a^\dagger_{(i,\sigma)}a_{(j,\sigma)}\right)^2 \quad (100)$$

$$= \frac{1}{2}\sum_{r=1}^R \Lambda^{(r)}\left(\underbrace{\sum_i L^{(r)}_{(ii)}\mathcal{I}}_{I_{L^{(r)}}} + \underbrace{\frac{i}{2}\sum_{i,j,\sigma}L^{(r)}_{(i,j)}(\gamma_{i,\sigma,0}\gamma_{j,\sigma,1})}_{M_{L^{(r)}}}\right)^2$$

$$= \underbrace{\left(\frac{1}{2}\sum_{r=1}^R \Lambda^{(r)} I_{L^{(r)}}^2\right)}_{I_{H_2}} + \underbrace{\left(\sum_{r=1}^R \Lambda^{(r)} I_{L^{(r)}} M_{L^{(r)}}\right)}_{M_{H_2}} +$$

$$\underbrace{\frac{1}{2}\sum_{r=1}^R \Lambda^{(r)} M_{L^{(r)}}^2}_{Two_{H_2}}$$

$$= \underbrace{\left(\frac{1}{2}\sum_{ij}h_{ii,jj}\right)}_{I_{H_2}} + \underbrace{\left(\frac{i}{2}\sum_{i,j,\sigma}\left(\sum_l h_{ll,i,j}\right)(\gamma_{i,\sigma,0}\gamma_{j,\sigma,1})\right)}_{M_{H_2}} +$$

$$\underbrace{-\frac{1}{8}\sum_{r=1}^R \Lambda^{(r)}\left(\sum_{i,j,\sigma}L^{(r)}_{i,j}(\gamma_{i,\sigma,0}\gamma_{j,\sigma,1})\right)^2}_{Two_{H_2}}$$

$$= \underbrace{\left(\frac{1}{2}\sum_{ij}h_{ii,jj}\right)}_{I_{H_2}} + \underbrace{\left(\frac{i}{2}\sum_{i,j,\sigma}\left(\sum_l h_{ll,i,j}\right)(\gamma_{i,\sigma,0}\gamma_{j,\sigma,1})\right)}_{M_{H_2}} +$$

$$\underbrace{-\frac{1}{4}\sum_{r=1}^R \Lambda^{(r)} T_2\left(\frac{1}{2}\sum_\sigma\sum_{ij}L^{(r)}_{i,j}(\gamma_{i,\sigma,0}\gamma_{j,\sigma,1})\right) - \frac{1}{8}\sum_{ij}h_{i,j,j,i}}_{Two_{H_2}}$$

The proof is then completed by collecting the terms and classify them as one of identity, one-body, or two-body.

[1] Masuo Suzuki. Fractal decomposition of exponential operators with applications to many-body theories and Monte Carlo simulations. *Physics Letters A*, 146(6):319-323, June 1990.

[2] Guang Hao Low. Hamiltonian simulation with nearly optimal dependence on spectral norm. In *Proceedings of the 51st Annual ACM Symposium on Theory of Computing-STOC* 19, pages 491-502, New York, N.Y., USA, 2019. ACM Press.

[3] Andrew M Childs and Nathan Wiebe. Hamiltonian Simulation Using Linear Combinations of Unitary Operations. *Quantum Information \& Computation*, 12(11-12): 901-924, November 2012.

[4] Guang Hao Low and Isaac L. Chuang. Hamiltonian simulation by qubitization. *Quantum*, 3:163, 2019.

[5] Guang Hao Low and Isaac L. Chuang. Optimal Hamiltonian Simulation by Quantum Signal Processing. *Physical Review Letters*, 118(1):010501, January 2017.

[6] Ryan Babbush, Craig Gidney, Dominic W. Berry, Nathan Wiebe, Jarrod McClean, Alexandru Paler, Austin Fowler, and Hartmut Neven. Encoding electronic spectra in quantum circuits with linear T complexity. *Physical Review X*, 8(4):041015, October 2018.

[7] Shantanav Chakraborty, András Gilyén, and Stacey Jeffery. The power of block-encoded matrix powers: improved regression techniques via faster Hamiltonian simulation. *arXiv preprint arXiv:*1804.01973, April 2018.

[8] Bo Peng and Karol Kowalski. Highly efficient and scalable compound decomposition of two-electron integral tensor and its application in coupled cluster calculations. *Journal of Chemical Theory and Computation*, 13(9):4179-4192, September 2017.

[9] Dominic W. Berry, Craig Gidney, Mario Motta, Jarrod R. McClean, and Ryan Babbush. Qubitization of Arbitrary Basis Quantum Chemistry Leveraging Sparsity and Low Rank Factorization. *arXiv preprint arXiv:*1902.02134, February 2019.

[10] Guang Hao Low, Vadym Kliuchnikov, and Luke Schaeffer. Trading T-gates for dirty qubits in state preparation and unitary synthesis. *arXiv preprint arXiv:*1812.00954, December 2018.

[11] V. V. Shende, S. S. Bullock, and I. L. Markov. Synthesis of quantum-logic circuits. *IEEE Transactions on Computer-Aided Design of Integrated Circuits and Systems*, 25(6):1000-1010, June 2006.

[12] Craig Gidney. Halving the cost of quantum addition. *Quantum*, 2:74, June 2018.

[13] Steven A Cuccaro, Thomas G Draper, Samuel A Kutin, and David Petrie Moulton. A new quantum ripple-carry addition circuit. *arXiv preprint quant-ph/*0410184, 2004.

To further summarize, one aspect of this disclosure is directed to a method for simulating evolution of a real-world quantum system over time. The method comprises: applying a state-preparation sequence of quantum gates to a qubit register of a quantum computer, the state-preparation sequence being configured to prepare in the qubit register an initial model state representing an initial state of the real-world quantum system; receiving a Hamiltonian operator for the real-world quantum system, the Hamiltonian operator representing two-body potential-energy interactions in a factorized form comprising at least one Majorana operator; applying to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of the real-world quantum system; and applying a measurement operation to the qubit register of the quantum computer, the measurement operation being configured to reveal an observable property of the changed model state.

In some implementations, the two-body potential-energy interactions are represented by a rank-factorized tensor, the method further comprises block encoding the Hamiltonian operator. In some implementations, block encoding the Hamiltonian operator comprises block encoding a first sum of a product of matrix elements and Majorana operators. In some implementations, block encoding the Hamiltonian operator further comprises block encoding a Chebyshev polynomial of the first sum by qubitization, via two consecutive applications of the first sum. In some implementations, block encoding the Hamiltonian operator further comprises block encoding a second sum as a linear combination including the Chebyshev polynomial of the first sum. In some implementations, the rank-factorized tensor in the Hamiltonian is further factorized to reduce an eigenvalue norm. In some implementations, block encoding the Hamiltonian operator comprises block encoding a first basis-transformed Majorana operator. In some implementations, block encoding the Hamiltonian operator further comprises multiplying the first basis-transformed Majorana operator to block encode a second basis-transformed Majorana operator. In some implementations, block encoding the Hamiltonian operator further comprises block encoding a third sum of a product of matrix elements and Majorana operators as a linear combination including the second basis-transformed Majorana operator. In some implementations, block encoding the Hamiltonian operator further comprises block encoding a fourth sum of a product of matrix elements and Majorana operators as a linear combination including the third sum. In some implementations, applying the time-evolution-operator sequence of quantum gates comprises applying a programmable-rotation-gate array. In some implementations, applying the time-evolution-operator sequence of quantum gates comprises applying a multiplexed sparse-data lookup.

Another aspect of this disclosure is directed to a quantum computer comprising a qubit register including a plurality of qubits, a modulator configured to implement one or more quantum-logic operations on the plurality of qubits, a demodulator configured to output data exposing a quantum state of the plurality of qubits, a controller operatively coupled to the modulator and to the demodulator, and associated computer memory. The computer memory holds instructions that cause the controller to: apply a state-preparation sequence of quantum gates to a qubit register of a quantum computer, the state-preparation sequence being configured to prepare in the qubit register an initial model state representing an initial state of the real-world quantum system, receive a Hamiltonian operator for the real-world quantum system, the Hamiltonian operator representing two-body potential-energy interactions in a factorized form comprising at least one Majorana operator, apply to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of a real-world quantum system, and apply a measurement operation to the qubit register of the quantum computer, the measurement operation being configured to reveal an observable property of the changed model state.

In some implementations, the two-body potential-energy interactions are represented by a rank-factorized tensor, and applying the time-evolution-operator sequence of quantum gates to the qubit register comprises block encoding the Hamiltonian operator. In some implementations, block encoding the Hamiltonian operator comprises: block encoding a first sum of a product of matrix elements and Majorana operators; block encoding a Chebyshev polynomial of the first sum by qubitization, via two consecutive applications of the first sum; and block encoding a second sum as a linear combination including the Chebyshev polynomial of the first sum. In some implementations, the rank-factorized tensor in the Hamiltonian is further factorized to reduce an eigenvalue norm. In some implementations, block encoding the Hamiltonian operator comprises: block encoding a first basis-transformed Majorana operator; multiplying the first basis-transformed Majorana operator to block encode a second basis-transformed Majorana operator; block encoding a third sum of a product of matrix elements and Majorana operators as a linear combination including the second basis-transformed Majorana operator; and block encoding a fourth sum of a product of matrix elements and Majorana operators as a linear combination including the third sum.

Another aspect of this disclosure is directed to a method for simulating evolution of a real-world quantum system over time. The method comprises: applying a state-preparation sequence of quantum gates to a qubit register of a quantum computer, the state-preparation sequence being configured to prepare in the qubit register an initial model state representing an initial state of the real-world quantum system; receiving a Hamiltonian operator for the real-world quantum system, the Hamiltonian operator representing two-body potential-energy interactions in a factorized form comprising at least one Majorana operator; applying to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of the real-world quantum system; applying a measurement operation to the qubit register of the quantum computer, the measurement operation being configured to reveal an observable property of the changed model state; and returning the observable property of the changed model state.

In some implementations, the observable property is revealed via quantum phase estimation. In some implementations, the observable property is a stationary-state property.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for simulating evolution of a real-world quantum system over time, the method comprising:
    applying a state-preparation sequence of quantum gates to a qubit register of a quantum computer, the state-preparation sequence being configured to prepare in the qubit register an initial model state representing an initial state of the real-world quantum system;
    receiving a Hamiltonian operator for the real-world quantum system, the Hamiltonian operator representing two-body potential-energy interactions in a factorized form comprising at least one Majorana operator;
    applying to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of the real-world quantum system; and
    applying a measurement operation to the qubit register of the quantum computer, the measurement operation being configured to reveal an observable property of the changed model state.

2. The method of claim 1 wherein the two-body potential-energy interactions are represented by a rank-factorized tensor, the method further comprising block encoding the Hamiltonian operator.

3. The method of claim 2 wherein block encoding the Hamiltonian operator comprises block encoding a first sum of a product of matrix elements and Majorana operators.

4. The method of claim 3 wherein block encoding the Hamiltonian operator further comprises block encoding a Chebyshev polynomial of the first sum by qubitization, via two consecutive applications of the first sum.

5. The method of claim 4 wherein block encoding the Hamiltonian operator further comprises block encoding a second sum as a linear combination including the Chebyshev polynomial of the first sum.

6. The method of claim 2 wherein the rank-factorized tensor in the Hamiltonian is further factorized to reduce an eigenvalue norm.

7. The method of claim 6 wherein block encoding the Hamiltonian operator comprises block encoding a first basis-transformed Majorana operator.

8. The method of claim 7 wherein block encoding the Hamiltonian operator further comprises multiplying the first basis-transformed Majorana operator to block encode a second basis-transformed Majorana operator.

9. The method of claim 8 wherein block encoding the Hamiltonian operator further comprises block encoding a third sum of a product of matrix elements and Majorana operators as a linear combination including the second basis-transformed Majorana operator.

10. The method of claim 9 wherein block encoding the Hamiltonian operator further comprises block encoding a fourth sum of a product of matrix elements and Majorana operators as a linear combination including the third sum.

11. The method of claim 1 wherein applying the time-evolution-operator sequence of quantum gates comprises applying a programmable-rotation-gate array.

12. The method of claim 1 wherein applying the time-evolution-operator sequence of quantum gates comprises applying a multiplexed sparse-data lookup.

13. A quantum computer comprising:
    a qubit register including a plurality of qubits;
    a modulator configured to implement one or more quantum-logic operations on the plurality of qubits;
    a demodulator configured to output data exposing a quantum state of the plurality of qubits;
    a controller operatively coupled to the modulator and to the demodulator; and computer memory holding instructions that cause the controller to:
apply a state-preparation sequence of quantum gates to a qubit register of a quantum computer, the state-preparation sequence being configured to prepare in the qubit register an initial model state representing an initial state of the real-world quantum system,
receive a Hamiltonian operator for the real-world quantum system, the Hamiltonian operator representing two-body potential-energy interactions in a factorized form comprising at least one Majorana operator,
apply to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of a real-world quantum system, and
apply a measurement operation to the qubit register of the quantum computer, the measurement operation being configured to reveal an observable property of the changed model state.

14. The quantum computer of claim 13 wherein the two-body potential-energy interactions are represented by a rank-factorized tensor, and wherein applying the time-evolution-operator sequence of quantum gates to the qubit register comprises block encoding the Hamiltonian operator.

15. The quantum computer of claim 14 wherein block encoding the Hamiltonian operator comprises:
block encoding a first sum of a product of matrix elements and Majorana operators;
block encoding a Chebyshev polynomial of the first sum by qubitization, via two consecutive applications of the first sum; and
block encoding a second sum as a linear combination including the Chebyshev polynomial of the first sum.

16. The quantum computer of claim 13 wherein the rank-factorized tensor in the Hamiltonian is further factorized to reduce an eigenvalue norm.

17. The quantum computer of claim 16 wherein block encoding the Hamiltonian operator comprises:
block encoding a first basis-transformed Majorana operator;
multiplying the first basis-transformed Majorana operator to block encode a second basis-transformed Majorana operator;
block encoding a third sum of a product of matrix elements and Majorana operators as a linear combination including the second basis-transformed Majorana operator; and
block encoding a fourth sum of a product of matrix elements and Majorana operators as a linear combination including the third sum.

18. A method for simulating evolution of a real-world quantum system over time, the method comprising:
applying a state-preparation sequence of quantum gates to a qubit register of a quantum computer, the state-preparation sequence being configured to prepare in the qubit register an initial model state representing an initial state of the real-world quantum system;
receiving a Hamiltonian operator for the real-world quantum system, the Hamiltonian operator representing two-body potential-energy interactions in a factorized form comprising at least one Majorana operator;
applying to the qubit register of the quantum computer a time-evolution-operator sequence of quantum gates comprising a block-encoded form of the Hamiltonian operator, where application of the time-evolution-operator sequence yields a changed model state in the qubit register, the changed model state being changed relative to the initial model state to represent a time-evolved state of the real-world quantum system;
applying a measurement operation to the qubit register of the quantum computer, the measurement operation being configured to reveal an observable property of the changed model state; and
returning the observable property of the changed model state.

19. The method of claim 18 wherein the observable property is revealed via quantum phase estimation.

20. The method of claim 18 wherein the observable property is a stationary-state property.

* * * * *